United States Patent
Kohchi

(10) Patent No.: US 6,865,290 B2
(45) Date of Patent: Mar. 8, 2005

(54) METHOD AND APPARATUS FOR RECOGNIZING DOCUMENT IMAGE BY USE OF COLOR INFORMATION

(75) Inventor: Tsukasa Kohchi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 712 days.

(21) Appl. No.: 09/838,311

(22) Filed: Apr. 20, 2001

(65) Prior Publication Data

US 2002/0006220 A1 Jan. 17, 2002

(30) Foreign Application Priority Data

Apr. 25, 2000 (JP) ...................................... 2000-124941

(51) Int. Cl.⁷ ................................................ G06K 9/00
(52) U.S. Cl. ..................................... 382/165; 382/173
(58) Field of Search ............................... 382/164, 165, 382/162, 173, 176, 177, 180, 181, 224; 358/462, 464

(56) References Cited

U.S. PATENT DOCUMENTS

| | | | | |
|---|---|---|---|---|
| 5,331,442 A | * | 7/1994 | Sorimachi | 358/532 |
| 5,724,441 A | * | 3/1998 | Yoshida | 382/166 |
| 5,900,953 A | * | 5/1999 | Bottou et al. | 358/540 |
| 6,005,680 A | * | 12/1999 | Luther et al. | 358/2.1 |
| 6,360,006 B1 | * | 3/2002 | Wang | 382/162 |

FOREIGN PATENT DOCUMENTS

| | | |
|---|---|---|
| JP | 5-064016 | 3/1993 |
| JP | 6-339019 | 12/1994 |
| JP | 7-099581 | 4/1995 |
| JP | 7-168939 | 7/1995 |
| JP | 10-143608 | 5/1998 |
| JP | 2001-008032 | 1/2001 |

* cited by examiner

*Primary Examiner*—Yon J. Couso
(74) *Attorney, Agent, or Firm*—Oblon, Spivak, McClelland, Maier & Neustadt, P.C.

(57) ABSTRACT

A method of recognizing a document image including a plurality of areas is provided. The method includes the steps of inputting the document image as a digital image, specifying a background color of the document image, reducing the size of the document image if necessary, extracting a plurality of pixels located in areas other than a background area from the document image by use of the background color, creating a plurality of connected elements by combining the plurality of pixels, and classifying the plurality of connected elements into a plurality of fixed types of areas by using at least features of shapes of the plurality of connected elements to obtain an area-separated document image. Additionally, a feedback process is performed if necessary, by performing binary area separation to a binary image and comparing a result of the binary area separation and a result of color area separation, to create a binary image suitable for an OCR process and to obtain a result of area separation.

29 Claims, 21 Drawing Sheets

FIG. 4

```
         area0    area1    area2    area3    area4    area5    area6    area7    area8
         00...    ..11.    .....    .....    .444.    .....    .....    .....    .....
         000..    .111.    ..2P.    ...P3    .444.    .55P.    ...66    ...P.    ..888
         .OP..    .P1..    .222.    ..333    ..P..    .55P.    ..P66    ..777    .OP8.
         .....    .....    .22..    ...33    .....    .55..    ...66    ..777    ..888
         .....    .....    .....    .....    .....    .....    .....    .....    .....
```

P : CENTER OF 5×5 BLOCK AREA
. : POINT OUTSIDE EACH AREA (area n (n=0...8))
n : POINT INSIDE EACH AREA (n=0...8)

WHITE CHARACTER PIXEL ON BLACK BACKGROUND

3×3 BLOCK

BLACK CHARACTER PIXEL ON WHITE BACKGROUND

3×3 BLOCK

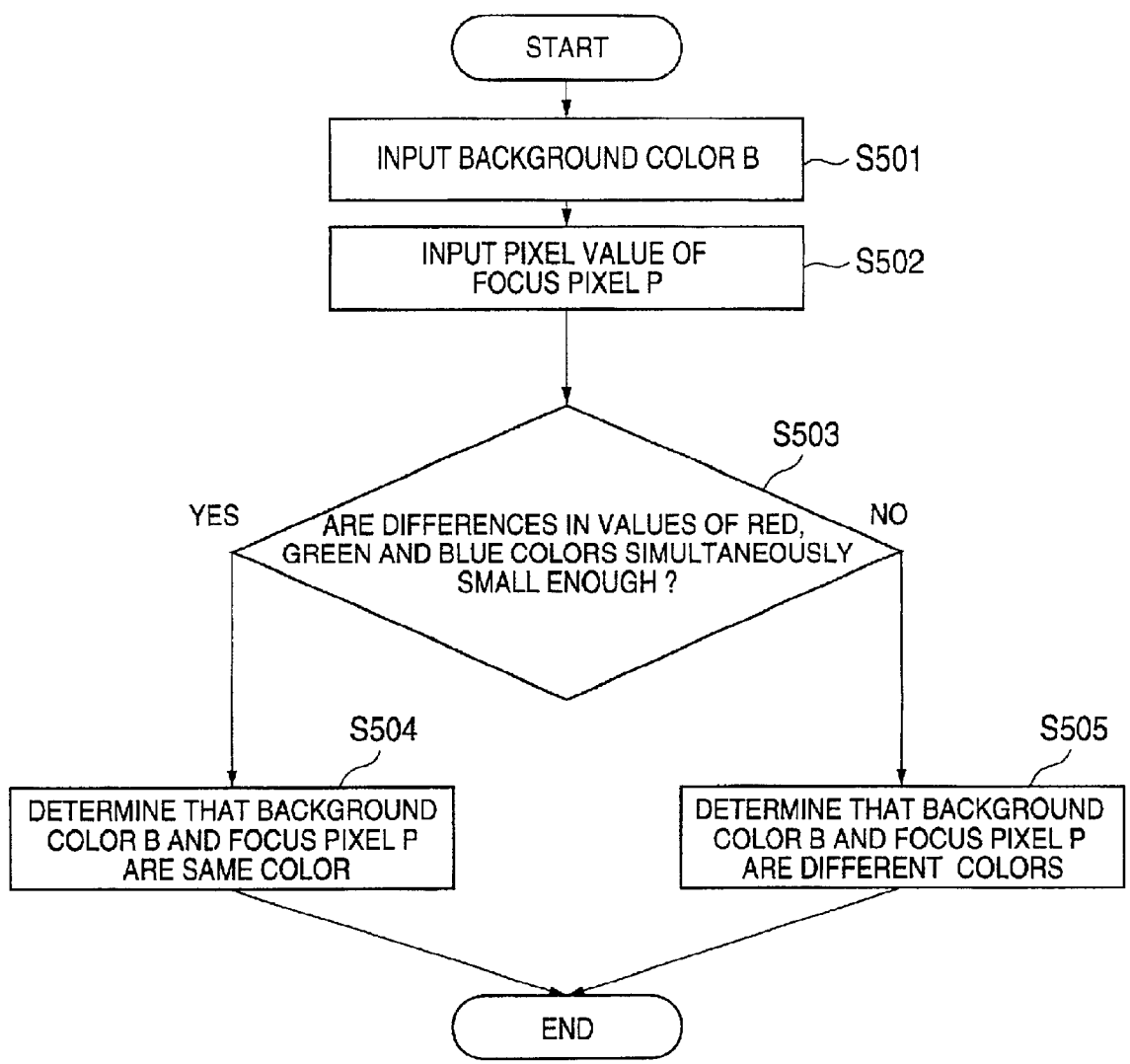

FIG. 11
ORIGINAL IMAGE
(EACH CELL IS SEPARATED BY COLOR)
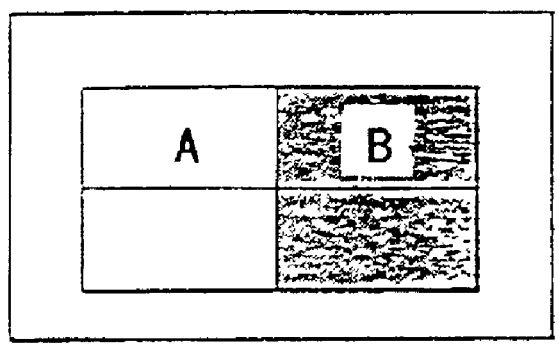
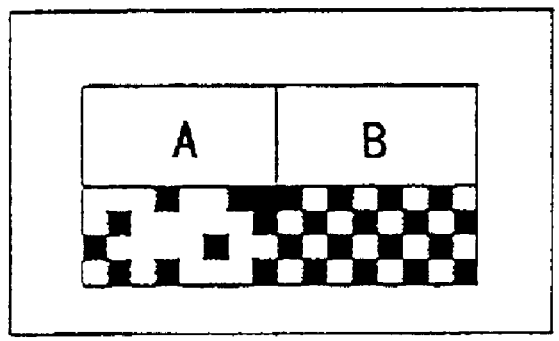
RESULT OF BINARIZING ORIGINAL IMAGE
BY ANALYZING EACH AREA

FIG. 12
ORIGINAL IMAGE
(GRADATION TEXTURE)
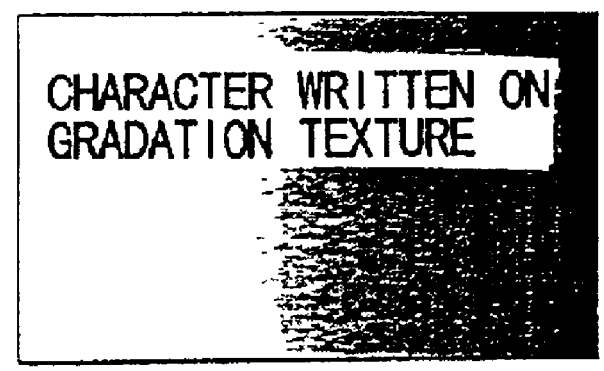
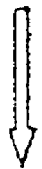
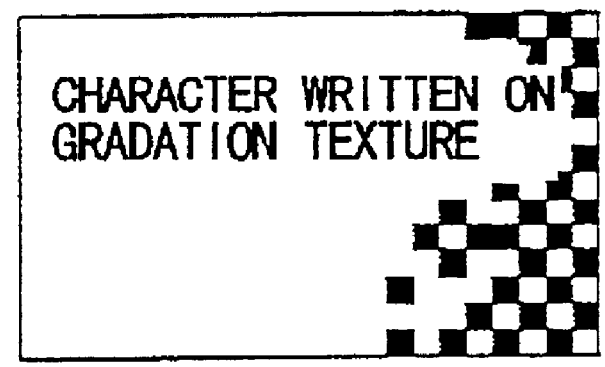
RESULT OF BINARIZING ORIGINAL IMAGE
BY ANALYZING EACH AREA

FIG. 17

| WIDTH OF AREA | WIDTH OF GRATING |
|---|---|
| 512 | 32 |
| 1024 | 64 |
| 2048 OVER | 128 |

RESULT OF COLOR AREA SEPARATION PROCESS        RESULT OF BINARY AREA SEPARATION PROCESS

AREA RECTANGLE
TEXT RECTANGLE

METHOD AND APPARATUS FOR RECOGNIZING DOCUMENT IMAGE BY USE OF COLOR INFORMATION

BACKGROUND OF THE INVENTION

1. Field of the Invention

The present invention relates to a technology to separate a document image into a plurality of areas. More particularly, the present invention relates a technology to detect characters, ruled lines and the like, and to recognize the characters, by separating areas including photographs and the like in a colored document image, for reproducing a document including information about layouts and colors.

2. Description of the Related Art

Accurate separation of areas on a document is necessary as preparation for recognizing characters on the document in an OCR (Optical Character Reader) process. Generally, binarization of an image of a color document is carried out in area separation for performing the OCR process or the like on the color document. However, because of such binarization, the area separation cannot be carried out with high accuracy. As described above, the binarization of an image is often used in an area of related-art character recognition. On the other hand, color information is not often used actively in the related-art character recognition. For instance, an image-processing device disclosed in Japanese Laid-open Patent Application No. 07-099581 initially binarizes a color image to create a binary image, and then, performs an area separation process or a character recognition process to the binary image, in a case in which the color image is inputted to the image-processing device.

Additionally, related-art technologies regarding area separation performed on a colored document image are described below.

Japanese Laid-open Patent Application No. 05-064016 discloses an image-compression device that separates natural pictures (photographs) and line drawings (characters, illustrations and graphs) for the purpose of compressing an input colored document image efficiently. However, Japanese Laid-open Patent Application No. 05-064016 does not disclose a technology to efficiently separate a text area and areas other than the text area. Therefore, a result of area separation according to the technology is hardly adapted to the OCR process on a color document.

Additionally, Japanese Laid-open Patent Application No. 06-339019 discloses a method of separating a text area and a photograph area on a document image by expressing the document image in a frequency element, and then, by using discrete cosine transformation. In the method, a color image having high resolution and high quality must be provided for accurately extracting coefficients that characterize a character and a photograph from discrete cosine transformation coefficients. Therefore, there is a chance of consuming an enormous disk-memory capacity as well as taking a long execution time, according to the method disclosed in Japanese Laid-open Patent Application No. 06-339019.

Additionally, Japanese Laid-open Patent Application No. 07-168939 discloses a colored-image area separation device separating a colored photograph area and an area including a figure having a few color variations or characters, by use of a hue histogram. However, Japanese Laid-open Patent Application No. 07-168939 focuses on a hue for separating the areas, and, thus, is ineffective to a monochrome or gray-scale document such as newspaper.

As described above, a number of methods regarding the OCR process are currently suggested. However, the most of the suggested methods are intended for a binary image. Thus, a condition of the binary image has large influence on recognition accuracy. On the other hand, a colored document has a tendency to have not only more color variations, but also a more complicated document layout. However, even if an area separation process according to a related-art method is performed on a binary image created from a color image, satisfactory accuracy in the area separation cannot be generally acquired.

A number of methods have been suggested for creating a binary image suitable for character recognition. A typical method of creating such a binary image is a discriminant analysis method. For instance, Japanese Laid-open Patent Application No. 10-143608 discloses a technology to create a binary image suitable for the OCR process, by taking the following steps. An image having shades is initially binarized by use of a threshold. Then, an average line width on the created binary image is calculated. If a value of the average line width is outside a regulated range, the created binary image is determined to be inappropriate for character recognition, and the binarization of the image is carried out again.

As described above, character recognition on a color document and reproduction of the color document including information about layouts and colors are hardly achieved by a related-art technology. In addition, accurate creation of a binary image suitable for the OCR process is hardly performed on a colored document, since the colored document has problems peculiar to colored documents.

SUMMARY OF THE INVENTION

Accordingly, it is a general object of the present invention to provide a method, an apparatus and a record medium readable by a computer, that are used for separating a plurality of areas included in a color, or a black and white (gray) image accurately and efficiently. Another object of the present invention is to provide a method, an apparatus and a record medium readable by a computer, that are used for creating an image suitable for an OCR process from a color document even in a case in which the color document has problems peculiar to the color document.

The above-described object of the present invention is achieved by a method of recognizing a document image including a plurality of areas, including the steps of inputting the document image as a digital image, specifying a background color of the document image, extracting a plurality of pixels located in areas other than a background area from the document image by use of the background color, creating a plurality of connected elements by combining the plurality of pixels, and classifying the plurality of connected elements into a plurality of fixed types of areas by using at least features of shapes of the plurality of connected elements to obtain an area-separated document image.

The above-described object of the present invention is also achieved by a document-image recognition device recognizing a document image including a plurality of areas, including an input unit inputting the document image as a digital image, a background-color specifying unit specifying a background color of the document image, an extracting unit extracting a plurality of pixels located outside a background area from the document image by use of the background color, a creating unit creating a plurality of connected elements by combining the plurality of pixels, and a classifying unit classifying the plurality of connected elements into a plurality of fixed types of areas by use of at least features of shapes of the connected elements to obtain an area-separated document image.

The above-described object of the present invention is also achieved by a record medium readable by a computer, tangibly embodying a program of instructions executable by the computer to carry out a document-image recognition process, the instructions including the steps of, inputting the document image as a digital image, specifying a background color of the document image, extracting a plurality of pixels located outside a background area from the document image by use of the background color, creating a plurality of connected elements by combining the plurality of pixels, and classifying the plurality of connected elements into a plurality of fixed types of areas by use of at least features of shapes of the connected elements to obtain an area-separated document image.

According to the present invention as described above, areas including characters, ruled lines, illustrations, and photographs can be distinguished directly from a color image by use of color information, without binarizing the areas. Accordingly, the color image does not lose the color information, and the present invention can achieve accurate area separation of the color image.

Another object of the present invention is achieved by a method of recognizing a document image, including the steps of a) inputting the document image as a digital image; b) performing color area separation to the document image; c) creating a binary image for each area separated by the color area separation; d) creating a single binary image by combining the binary image for each area, thereby performing binarization to the document image; e) performing binary area separation to the single binary image; f) comparing a result of the color area separation and a result of the binary area separation; and g) obtaining a binary image and a result of area separation by performing a feedback process until a certain condition is satisfied, or for a fixed times, in accordance with a result of the step (f).

The OCR process can be accurately performed to the color document that has problems peculiar to the color document, by including a feedback function feeding back to processes such as the binary area separation and the binarization preceding the OCR process.

Other objects, features and advantages of the present invention will become more apparent from the following detailed description when read in conjunction with the accompanying drawings.

BRIEF DESCRIPTION OF THE DRAWINGS

FIG. 4 is a diagram showing 9 types of areas used for a smoothing process referring to a 5×5 block area around a focus point;

FIG. 7 is a flowchart showing a process to determine whether a background color and a pixel value of a focus pixel are the same;

FIG. 11 is a diagram showing a table, in which each cell is separated by colors;

FIG. 12 is a diagram showing an image, in which characters are written on a gradation texture;

FIG. 17 is a diagram showing a table, in which a relation between a width of an area and a width of a grating is described;

DESCRIPTION OF THE PREFERRED EMBODIMENTS

A description will now be given of preferred embodiments of the present invention, with reference to the accompanying drawings.

Figure 1:
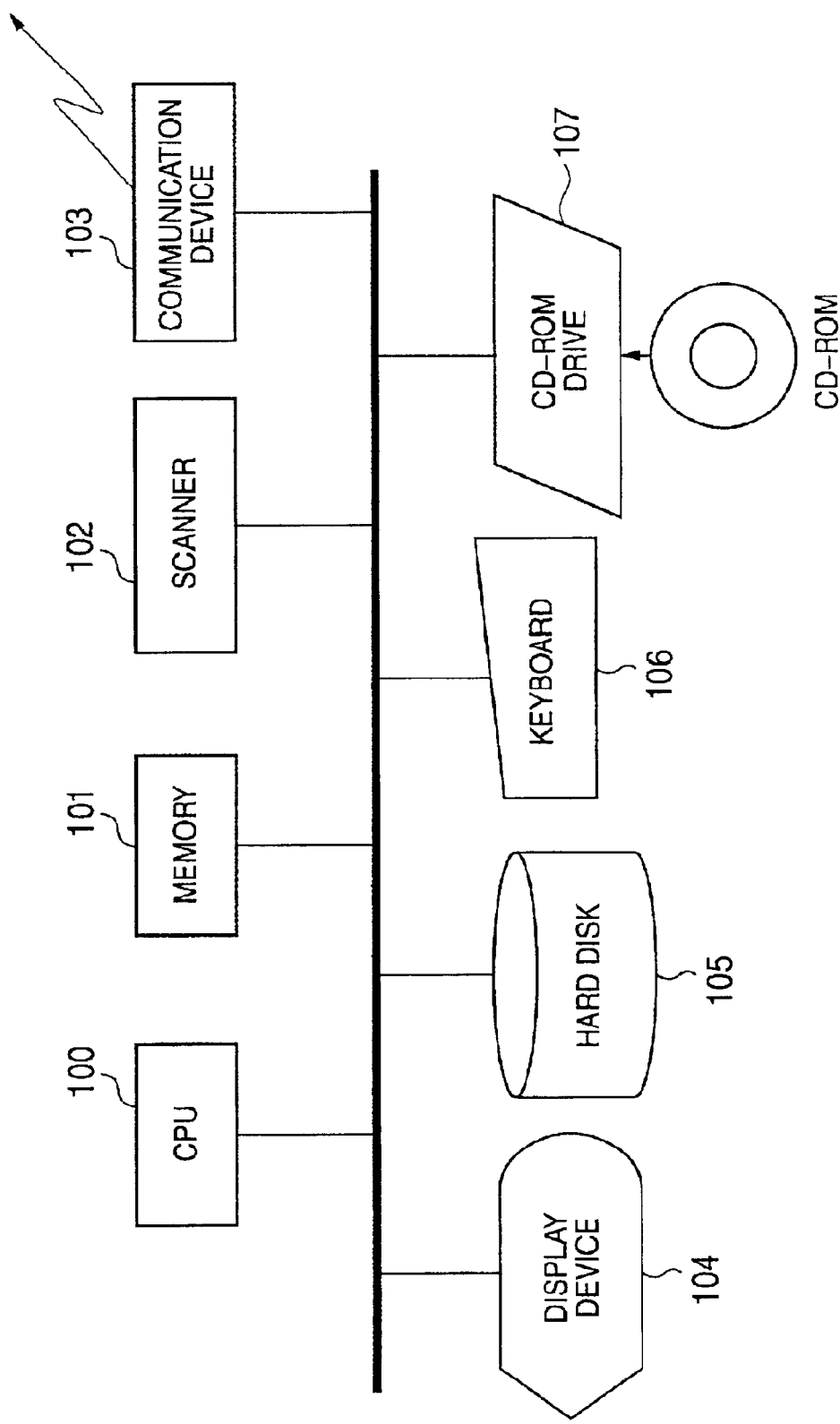
FIG. 1 is a block diagram showing a structure of a document-image recognition device, according to a first embodiment of the present invention.

FIG. 1 is a block diagram showing a structure of a document-image recognition device, according to a first embodiment of the present invention. As shown in FIG. 1, the document-image recognition device includes a CPU (Central Processing Unit) 100, a memory 101, a scanner 102, a communication device 103, a display device 104, a hard disk 105, a keyboard 106 and a CD-ROM (Compact Disk-Read Only Memory) drive 107.

The CPU 100 controls the entire document-image recognition device. The memory 101 stores data and programs processed by the CPU 100. The scanner 102 is connected to the document-image recognition device as a peripheral device, and has a function to input a document as a color digital image to the document-image recognition device. The communication device 103 controls a connection of the document-image recognition device to a network such as a LAN (Local Area Network). The hard disk 105 may be connected to the document-image recognition device as a peripheral device, or may be included in the document-image recognition device as an internal device. The keyboard 106 is used for inputting data to the document-image recognition device. The CD-ROM drive 107 drives a CD-ROM or the like, and reads data from or writes data to the CD-ROM or the like. An MO (Magneto-Optical) disk drive, an FD (Floppy Disk) drive, a DVD (Digital Video Disk) drive or the like may be substituted for the CD-ROM drive 107.

In the present invention, a program carrying out a later-described process is initially stored in a CD-ROM, for instance. The program is, then, loaded to the hard disk 105 through the CD-ROM drive 107. Once the program has started, a fixed program is expanded to the memory 101, and the later-described process is performed. The process is summarized as below.

First, contents of a document recorded on paper is inputted as a color digital image to the document-image recognition device through the scanner 102, and are stored in the memory 101 or the hard disk 105. Next, the CPU 100 carries out an area separation process shown in FIG. 2. At last, an OCR process is performed on the document whose areas are separated by the area separation process, for example.

Figure 2:
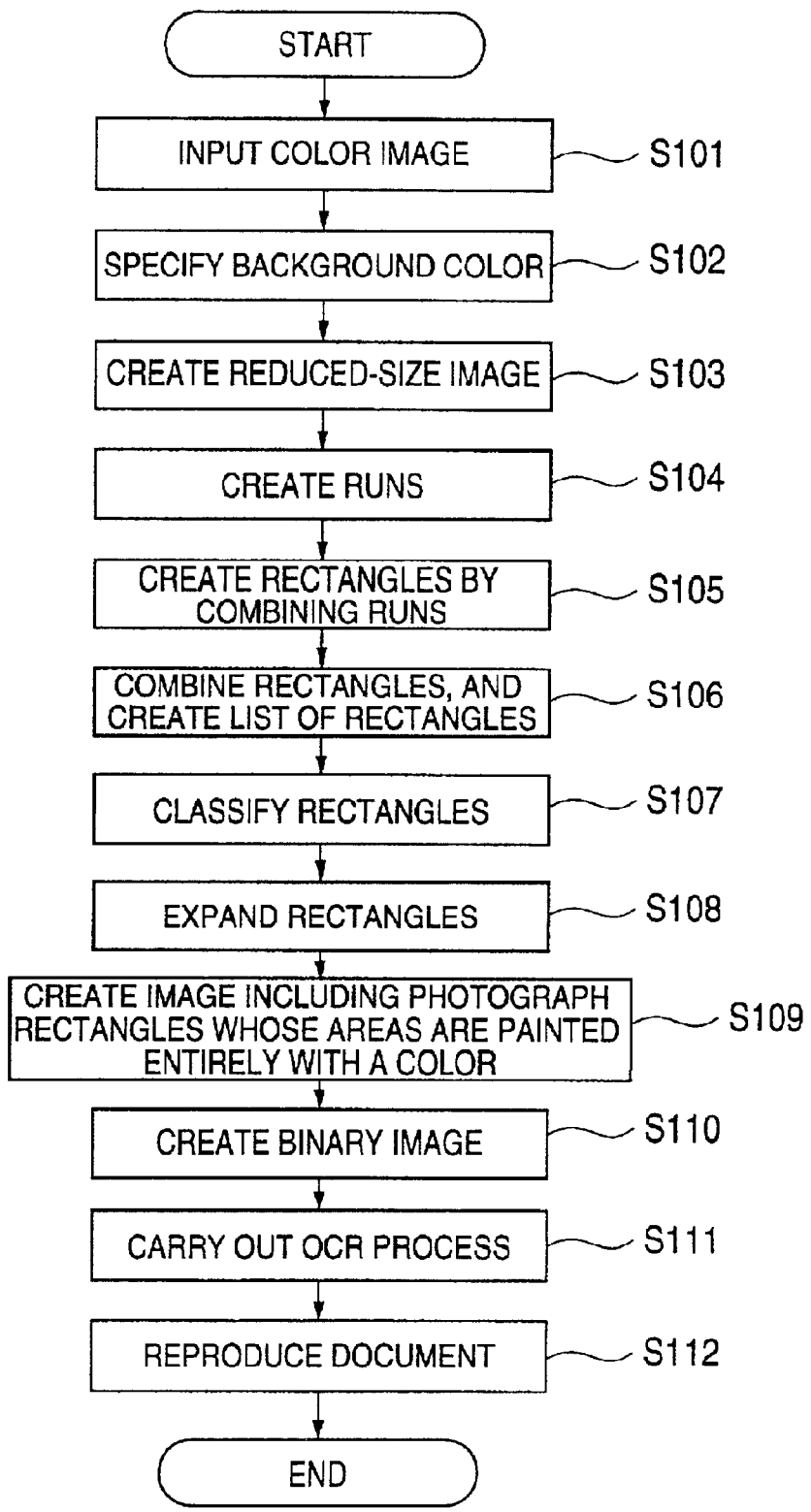
FIG. 2 is a flowchart showing processes performed in the first embodiment.

FIG. 2 is a flowchart showing processes performed in the first embodiment. A detailed description about each process shown in FIG. 2 will be given later.

At a step S101 shown in FIG. 2, a color document image is inputted to the document-image recognition device. The color document image is obtained from a paper document, and the like. This color document image can be inputted to the document-image recognition device as a color digital image through a scanner or a network. In the first embodiment, the number of colors on the color document image is set to a 24-bit full color. However, the present invention does not depend on the number of colors on the color document image or a resolution of the color document image. Additionally, an image processed by the document-image recognition device is expressed in a bitmap format. Thus, if an image such as a JPEG image expressed in a frequency element is inputted to the document-image recognition device, the entire image is initially converted to the bitmap format. For instance, an image format used in the first embodiment can be set to a 200 dpi, 24-bit color, Windows BMP, uncompressed, and color-expressed RGB coordinates format.

Next, at a step S102, the document-image recognition device detects a background color of an input image (an original image). Subsequently, at a step S103, the document-image recognition device reduces a size of the original image to limit an access cost to the original image. At a step S104, the document-image recognition device creates runs from pixels whose colors are different from the background color, for the reduced-size image. At a step S105, the document-image recognition device creates small rectangles by combining the runs. The document-image recognition device, then, combines all the small rectangles to create large-size rectangles, at a step S106. It should be noted that the step S102 and the step S103 can be switched.

The document-image recognition device classifies the large-size rectangles created at the step S106 to photograph rectangles including photographs, text rectangles including texts, ruled-line rectangles including ruled lines, and the like, at a step S107. Subsequently, at a step S108, the document-image recognition device expands coordinates of rectangles classified at the step S107 to fit actual coordinates of the rectangles on the original image. The above-described steps S101 through S108 are an area separation process of a color document image.

At a step S109, the document-image recognition device creates a color image that includes the photograph rectangles whose areas are painted entirely with a black color or a specified color, from the original image. At a step S110, the document-image recognition device creates a binary image whose resolution is approximately 400 dpi by converting the created color image to apply a related-art character recognition technology to the original image. Various methods are applicable to binarization of the created color image. For example, an Ohtsu method (a discriminant analysis method) can be applied to the binarization of the created color image.

The document-image recognition device carries out an OCR process on the created 400 dpi binary image by use of a related-art character recognition method, at a step S111. If necessary, a related-art area separation process may be performed on the 400 dpi binary image before the OCR process. Subsequently, a result of the related-art area separation process performed on the 400 dpi binary image may be compared with a result of the area separation performed on the color document image, and may be revised. The area separation process using color information according to the present invention may be applied especially to recognition of figure or photograph areas.

At a step S112, the document-image recognition device reproduces a document, for instance, in an HTML format, by combining a result of the OCR process and the photograph areas (rectangles) separated from the color document image. It is easy to reproduce a document layout since text codes can be recognized from the result of the OCR process, and coordinates of the figures and the photographs can be detected from the result of the area separation process performed on the figures and the photographs. For example, the document can be reproduced in a PDF, PS or RTF format. In such a case, the figures and the photographs are expressed in original colors expressed in the original image. The document can be reproduced logically by use of the HTML format, and by considering a reading order. Additionally, the figures and the photographs can be expressed in the original colors. Accordingly, a usage of the document reproduced in the HTML format on the Web is very effective.

Figure 3:
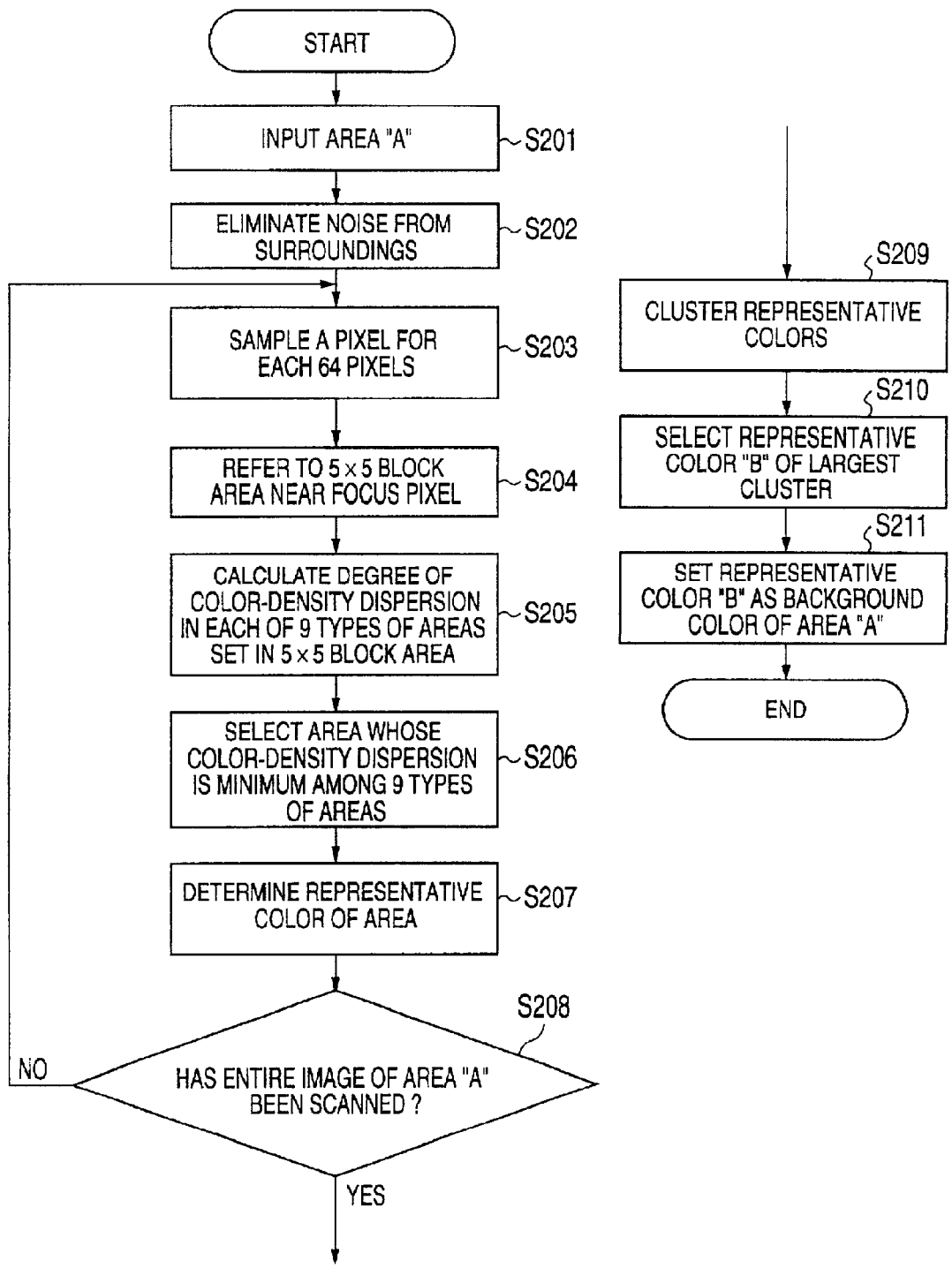
FIG. 3 is a flowchart showing a background-color specifying process.

A detailed description will now be given of a background-color specifying process corresponding to the step S102 shown in FIG. 2, the background-color specifying process being performed for specifying a background color of a given rectangular area or an entire document image. FIG. 3 is a flowchart showing the background-color specifying process.

First, a rectangle or an area "A" is inputted to the document-image recognition device as an object of the background-color specifying process, at a step S201. If the rectangle A inputted at the step S201 is the entire document image, a noise removing process is performed on the rectangle A in order to eliminate a noise expected to be mixed with an image of the rectangle A from surroundings when scanning the rectangle A, at a step S202. For example, an area of the rectangle A to be the object of the background-color specifying process can be reduced.

Next, the document-image recognition device carries out a clustering process on colors used in the rectangle A to examine a distribution of the colors in the rectangle A, at steps S203 through S209.

At the step S203, the document-image recognition device samples a pixel for each 64 pixels in the rectangle A. In the first embodiment, the document-image recognition device samples pixels of the rectangle A at regular intervals instead of scanning the entire rectangle A, to speed up the background-color specifying process. At the step S204, the document-image recognition device obtains a pixel value used for clustering the colors, from a sampled pixel P or a focus pixel P. The document-image recognition device obtains a smoothed pixel value by referring to an area around the focus pixel P, to protect edges of a text part included in the document image. In the first embodiment, the area around the focus pixel P is assumed to be a 5×5 block area having the focus pixel P as its center.

A smoothing process referring to the 5×5 block area having the focus pixel P as its center is performed at the steps S205 through S207, by following a method described in a reference, Hideyuki Tamura. An Introduction To Computer Image Processing. Souken Shuppan, Japan, FIG. 4.12, p105, for example. In details, at the step S205, the document-image recognition device defines 9 types of areas in the 5×5 block area for the focus pixel P, and calculates a degree of a color-density dispersion in each area. FIG. 4 shows the 9 types of areas described in the above reference. Subsequently, at the step S206, the document-image recognition device selects an area whose color-density dispersion is the minimum among the 9 types of the areas. The document-image recognition device, then, determines a representative color of the area by using an average of pixel values of pixels included in the area, at the step S207.

At the step S208, the document-image recognition device checks whether the document-image recognition device has scanned the entire area of the rectangle A. If it is determined at the step S208 that the document-image recognition device has not scanned the entire area of the rectangle A, the document-image recognition device proceeds to the step S203, and performs the steps S203 through S207, again. On the other hand, if it is determined at the step S208 that the document-image recognition device has finished scanning the entire area of the rectangle A, the document-image recognition device proceeds to the step S209, and clusters the representative color of each area determined at the step S207. A clustering method used at the step S209 can be one of well-known clustering methods. Subsequently, the document-image recognition device selects a representative color B of the largest cluster from a result of the clustering process, at a step S210, and, then, sets the representative color B as the background color of the rectangle A.

Figure 5:
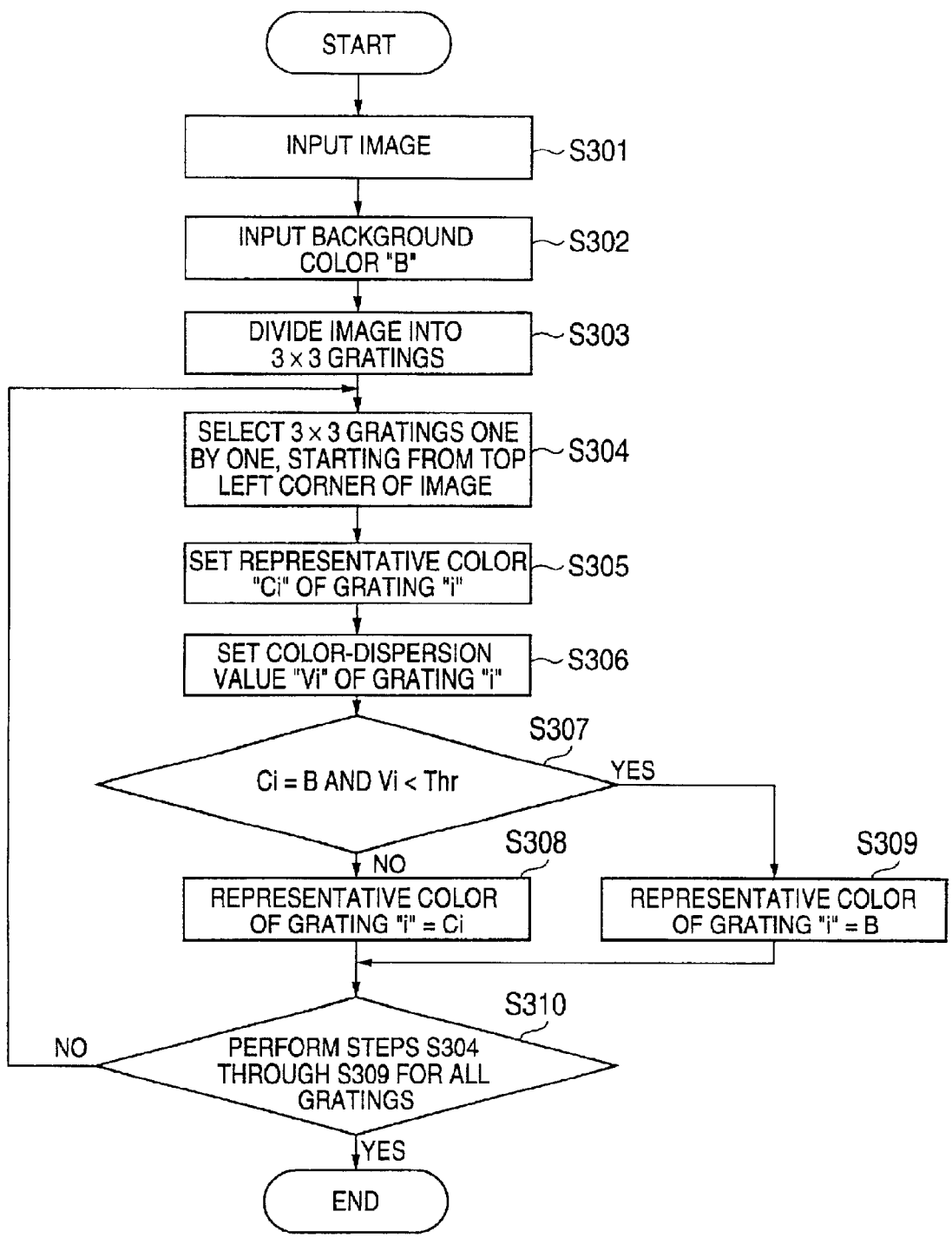
FIG. 5 is a flowchart showing a reduced-image creating process.

FIG. 5 is a flowchart showing a reduced-image creating process corresponding to the step S103 shown in FIG. 2. The reduced-image creating process is performed for limiting an access cost to the original image. The document-image recognition device creates a reduced-size image from the original image, at the step S103, and, then, performs the steps following the step S103 on the reduced-size image.

The original image is initially inputted to the document-image recognition device, at a step S301. The background color B obtained as described above is inputted to the document-image recognition device, at a step S302. The document-image recognition device divides the original image into a plurality of m×m gratings, at a step S303, and, then, selects the m×m gratings one by one, starting from the top left corner of the original image, at a step S304. In the first embodiment, the original image is divided into a plurality of 3×3 gratings. It should be noted that the gratings may be called blocks.

At a step S305, the document-image recognition device sets a representative color of a grating "i" to a representative color $C_i$. The representative color $C_i$ can be an average value of pixel values of all the pixels included in the grating "i". At a step S306, the document-image recognition device sets a degree of color dispersion in the grating "i" to a color-dispersion value $V_i$. Subsequently, the document-image recognition device compares the representative color $C_i$ of the grating "i" with the background color B, as well as compares the color-dispersion value $V_i$ of the grating "i" with a predetermined value (Thr), at a step S307. If it is determined at the step S307 that the representative color $C_i$ of the grating "i" is almost same as the background color B, and the color-dispersion value $V_i$ of the grating "i" is small enough, the document-image recognition device defines the background color B as the representative color of the grating "i", and compresses the grating "i" to a single pixel value (the background color B), at a step S309. If it is determined at the step S307 that the representative color $C_i$ of the grating "i" is not almost same as the background color B, or the color-dispersion value $V_i$ of the grating "i" is not small enough, the document-image recognition device keeps the representative color $C_i$ of the grating "i", and compresses the grating "i" to a single pixel value (the representative color $C_i$), at a step S308. In other words, the grating "i" is compressed to ⅑ of its original size.

At a step S310 following the steps S308 and S309, the document-image recognition device checks whether the document-image recognition device has performed the steps S304 through S309 for all the gratings included in the original image. If it is determined at the step S310 that the document-image recognition device has performed the steps S304 through S309 for all the gratings, the document-image recognition device finishes the above-described reduced-image creating process. Else, the document-image recognition device proceeds to the step S304, and performs the steps S304 through S310 until the document-image recognition device completes the steps S304 through S309 for each grating included in the original image.

Figure 6A:
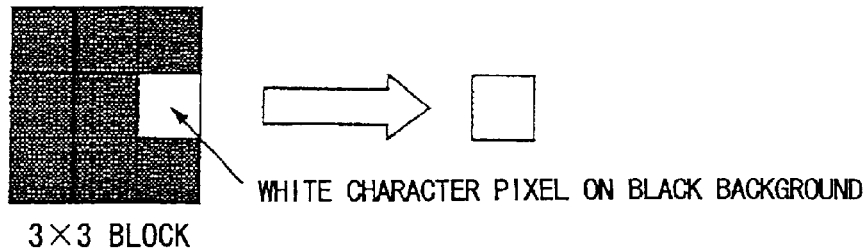
FIGS. 6A and 6B are diagrams showing the reduced-image creating process applied to a binary image.
Figure 6B:
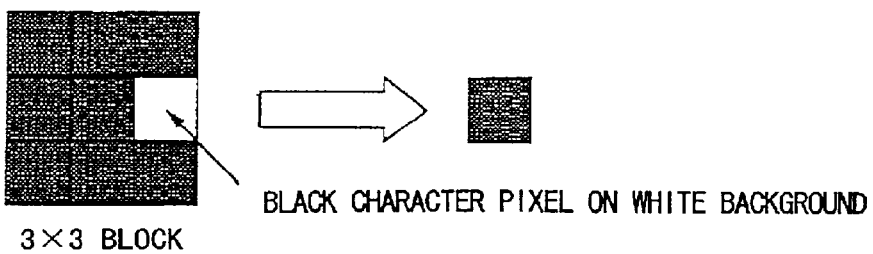

The above reduced-image creating process (an image compression process) will be further described. FIGS. 6A and 6B are diagrams showing an image compression process named a 3×3 block OR compression performed on a binary image. For instance, if a pixel included in a 3×3 block is a pixel of a white-colored character on a black background color, the 3×3 block is represented by a white pixel of the white-colored character, as shown in FIG. 6A. If a pixel included in the 3×3 block is a pixel of a black-colored character on a white background color, the 3×3 block is represented by a black pixel of the black-colored character, as shown in FIG. 6B. According to the OR compression applied to the binary image, a light-colored character pixel possibly disappears when an entire image is compressed, in a case in which the image is a document image including a light-colored character on a black background, or a color image. However, such a problem can be solved by use of the reduced-image creating process described with reference to FIG. 5.

In the present invention, the background color B is determined in advance, in a wide area including an object block (grating). If the representative color $C_i$ of the object grating is almost same as the background color B, and a color-dispersion value of the object grating is small enough, the object grating is represented by the background color B. Else, the object grating is represented by the representative color $C_i$ of the object grating. Accordingly, a document element remains as the representative color $C_i$, and the others become the background color B. Thus, a color image can be compressed effectively. In other words, adjacent characters become combined by the above-described OR compression, and characters separated by at least 1 mm remain the same. Thus, regarding to an area separation process, the most appropriately compressed image can be obtained for the present invention that creates a document element (rectangle) by combining pixels in a bottom-up manner. Additionally, such compression also has an effect to smooth the color image.

Image compression is indispensable in an area separation process of the color image, for increasing a processing speed and minimizing a memory used for the area separation process. However, an image having a high resolution or a high quality is not necessary for the area separation process itself, whereas such an image is necessary in an OCR process. Accordingly, the image compression carried out by the reduced-image creating process (a grating-block process) shown in FIG. 5 has an advantage in its application to the document-image recognition device and a speed of the entire process performed by the document-image recognition device. In details, the document-image recognition device can increase its processing speed, and can reduce a memory used for the image compression, by use of the reduced-image creating process shown in FIG. 5.

Each block size is set to 3×3 in the first embodiment, since figures and characters are assumed to be separated by at least 1 mm in the original image. In other words, the figures and the characters are not united if the image compression applied to the original image is the 3×3 compression. If the original image is a 200 dpi image, 3×3 or 4×4 is considered to be an appropriate block size for the image compression.

A description will now be given of a run creating process corresponding to the step S104 shown in FIG. 2. If the original image is a binary image, a black run is created by combining black pixels, which are adjacent to each other on a single line. On the other hand, according to the present invention, a pixel is set to have a value "0" if a pixel value of the pixel is almost same as the background color B. Else, the pixel is set to have a value "1". A run is created by combining pixels having the value "1". FIG. 7 is a flowchart showing a process to determine whether a background color and a pixel value of a focus pixel are the same.

The background color B and a pixel value of the focus pixel P are inputted to the document-image recognition device respectively at a step S501 and a step S502. At a step S503, the document-image recognition device checks whether absolute values of differences between RGB colors of the background color B and the respective RGB colors of the pixel value of the focus pixel P are small enough. If all of the absolute values are determined to be small enough, the document-image recognition device determines that the background color B and the focus pixel P are the same color, at a step S504. If not all of the absolute values are small enough, the document-image recognition device determines that the background color B and the focus pixel P are different colors, at a step S505. The background color B and a pixel "p" can be expressed as (r, g, b) and $(r_p, g_p, b_p)$ respectively in the RGB colors. For example, the absolute values of difference between the RGB colors of the background color B and the pixel "p" are simultaneously small enough if the background color B and the pixel "p" satisfy the following condition.

$|r-r_p|<100$, $|g-g_p|<100$, and $|b-b_p|<100$

The document-image recognition device creates a plurality of runs from the reduced-size image obtained at the step S103, by applying the above-described run creating process one line by one line to the reduced-size image, starting from the top left corner thereof. For example, a run is a rectangle whose top left and bottom right coordinates are $(x_s, y_s, x_e, y_e)$.

At the step S105 shown in FIG. 2, the document-image recognition device creates a rectangle by combining a run located on the previous line and a run being currently created, in a case in which the runs have an overlap or a connection. The document-image recognition device, then, updates coordinates of the run located on the previous line. If two rectangles have an overlap or a connection, the document-image recognition device calculates the smallest coordinates, which includes the rectangles, and updates coordinates of one of the rectangles.

A rectangle or rectangle data is a set of information including coordinates $(X_s, Y_s, X_e, Y_e)$ of top left and bottom right corners of the rectangle, and an attribute of the rectangle such as a character, a ruled line, a figure, a photograph, and the like. The rectangle or the rectangle data further includes other attributes of the rectangle such as a character color, a background color, and the like. Examples of the rectangle are shown below.

1. Photograph Rectangle R1={(20, 40, 64, 72), photograph}
2. Character Rectangle R2={(20, 40, 30, 50), character, black, white}

The third element of the character rectangle R2 indicates that the character color of the rectangle R2 is black. Additionally, the fourth element of the character rectangle R2 indicates that the background color of the rectangle R2 is white. A run is one type of a rectangle, and has coordinates $(x_s, y_s, x_e, y_e)$, in which the coordinate $y_s$ is equal to the coordinate $y_e$.

The document-image recognition device expresses a result of the area separation process in a rectangle combining/rectangle-list creating process corresponding to the step S106 shown in FIG. 2, as a rectangle list={R1, R2, . . . , Rn}, in which "n" is the total number of extracted rectangles.

A description will now be given of a rectangle classifying process corresponding to the step S107 shown in FIG. 2. In the rectangle classifying process, the document-image recognition device classifies the rectangles created at the step S106 to rectangles including a character, a ruled line, a figure/photograph (or others), or a surrounding noise. The most significant rectangles in the present invention are rectangles including figures, photographs or others. The document-image recognition device uses a size, a height, a position, a height-width ratio, and the like, for determining features of a rectangle and classifying the rectangle. A description about the rectangle classifying process will be given below with reference to a flowchart shown in FIG. 8.

The rectangles created at the step S106 are initially inputted to the document-image recognition device as a list or an arrangement in a rectangle creating order, at a step S401. The following steps S402 through S421 are performed for each rectangle, from the beginning to the end of the list.

At the step S402, a rectangle being currently referred by the document-image recognition device is set as a rectangle R. The document-image recognition device examines the rectangle R whether the rectangle R has a feature as a rule line, at the step S403. If the rectangle R is long and narrow enough in a horizontal or vertical direction, the document-image recognition device classifies the rectangle R as a ruled line extended in the horizontal or vertical direction, at the step S406. If the rectangle R is not long and narrow enough in the horizontal or vertical direction, the document-image recognition device proceeds to the step S404, and examines the rectangle R whether a height of the rectangle R is short enough. If it is determined at the step S404 that the height of the rectangle R is short enough, the document-image recognition device classifies the rectangle R as a character rectangle including characters, at the step S407. If it is determined at the step S404 that the height of the rectangle R is not short enough, the document-image recognition device proceeds to the step S405.

The document-image recognition device examines the rectangle R whether an area of the rectangle R is small enough, at the step S405. If it is determined at the step S405 that the area of the rectangle R is small enough, the document-image recognition device classifies the rectangle R as a character rectangle, at the step S407. If it is determined at the step S405 that the area of the rectangle R is not small enough, the document-image recognition device proceeds to the step S408.

In details, the document-image recognition device decides that the rectangle R has a feature as a ruled line at the step S403, if the rectangle R has its height-width ratio higher than 20, else if the height of the rectangle R is less than 3 dots, else if the rectangle R is composed of long vertical or horizontal runs. At the step S404, the document-image recognition device decides that the height of the rectangle R is short enough if the height is less than or equal to 10 mm on paper. In other words, the document-image recognition device decides that the height of the rectangle R is short enough if the height is less than or equal to 80 dots on a 200 dpi image. Additionally, at the step S405, the document-image recognition device decides that the area of the rectangle R is small enough if the area of the rectangle R is less than or equal to 1600 dots.

At the step S408, the document-image recognition device classifies the rectangle R that does not satisfy any of the above conditions at the steps S403, S404 and S405, as a candidate for a figure/photograph or other-type rectangle. Subsequently, the document-image recognition device further classifies the rectangle R that is a candidate for a figure/photograph or other-type rectangle, at the following steps.

Assuming the rectangle R as a document image, the document-image recognition device recursively carries out the area separation process according to the present invention, to the rectangle R. In details, the document-image recognition device specifies a background color of the rectangle R, at the step S409. Subsequently, the document-image recognition device creates rectangles inside the rectangle R at the steps S410 through S412. Image compression is not necessarily performed on the rectangle R since the rectangle R is already compressed from the original image. Thus, a process corresponding to the step S103 shown in FIG. 2 is not performed on the rectangle R.

Figure 8:
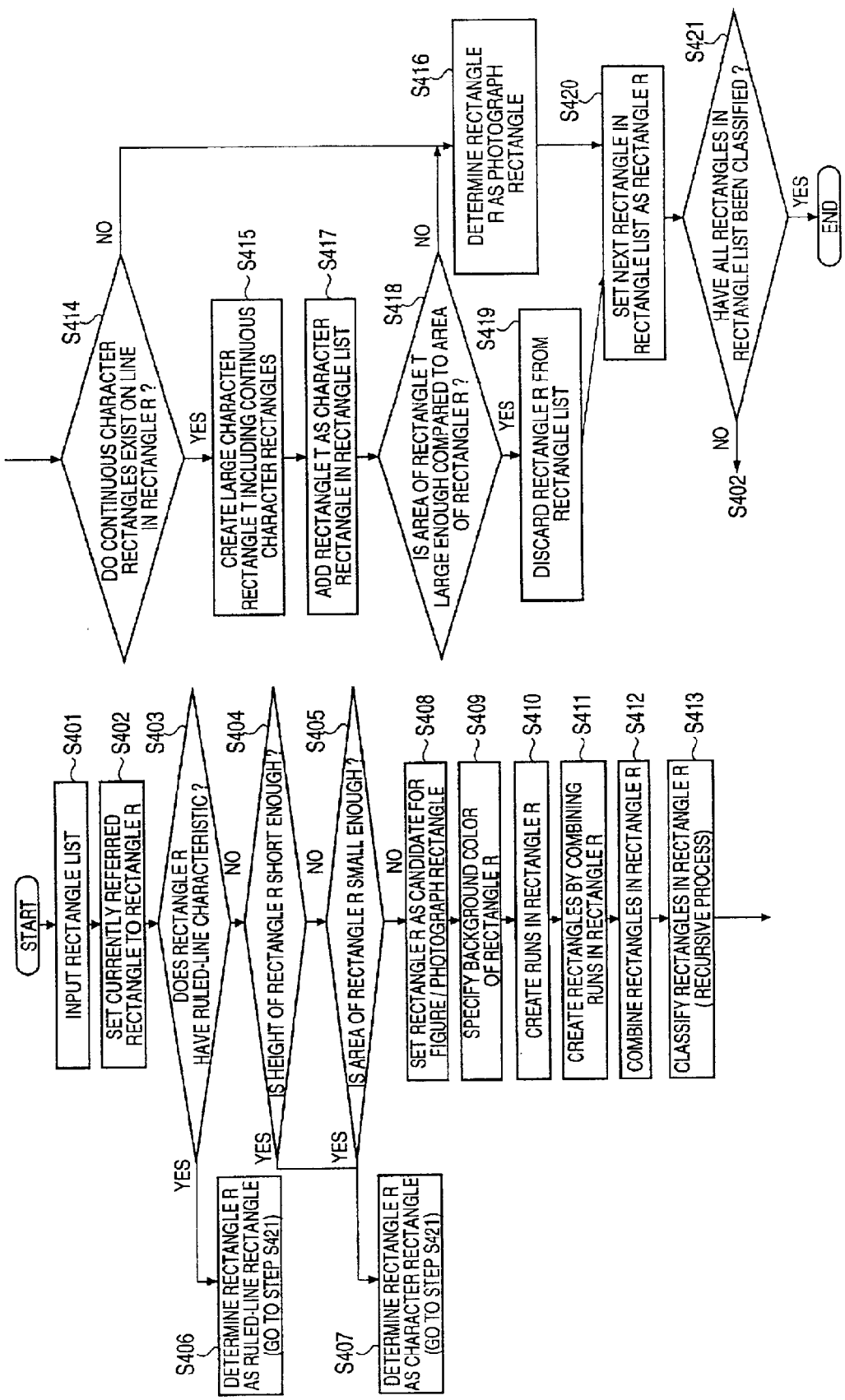
FIG. 8 is a flowchart showing a rectangle classifying process.

At the step S413, the document-image recognition device recursively carries out the rectangle classifying process included in the flowchart shown in FIG. 8, to the rectangle R. A reason that the document-image recognition device carries out the rectangle-creating/rectangle-classifying processes recursively is described below.

A color image, unlike a binary image, occasionally includes areas whose background colors are different. In such a case, the document-image recognition device might unite an entire area that has a background color different from the background color B of the entire color image, as a single rectangle by mistake in the rectangle-creating process. Accordingly, the document-image recognition device needs to carry out the rectangle-creating/rectangle-classifying processes recursively.

Figure 9:
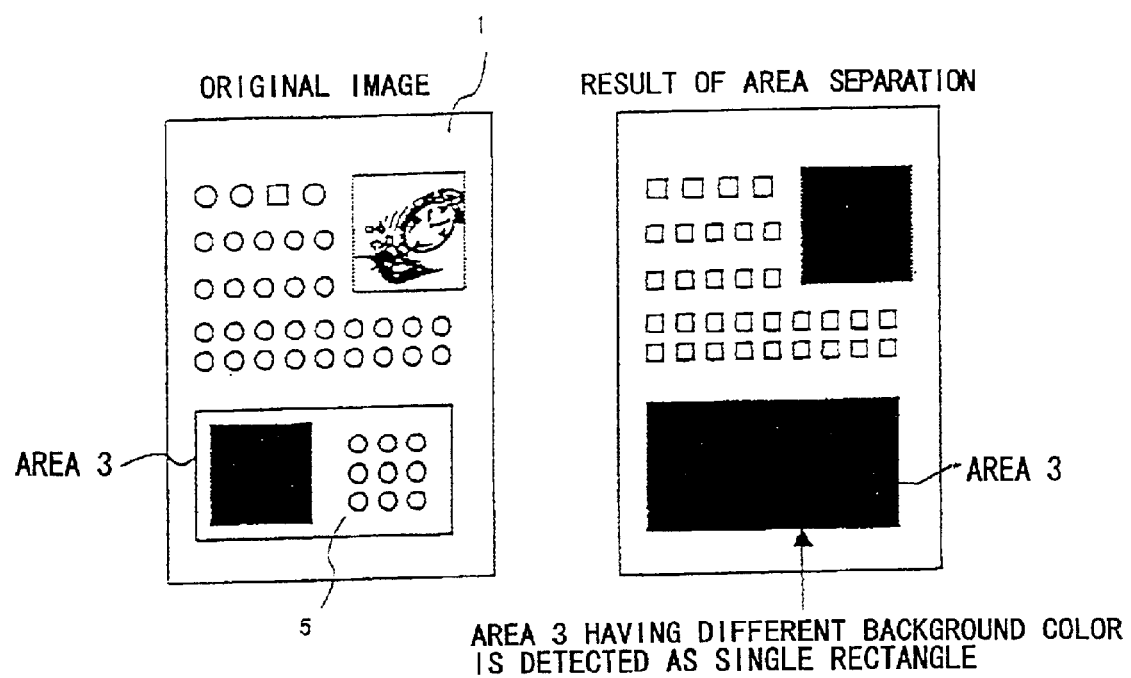
FIG. 9 is a diagram showing an example, in which an entire partial area of an original image is detected as a rectangle.

For example, if a background color 1 of an original image shown in FIG. 9 is different from a background color 5 of an area 3, the document-image recognition device detects the area 3 as a single rectangle as a result of the area separation process. Thus, the document-image recognition device carries out the rectangle-creating/rectangle-classifying processes again, to the area 3.

At the step S414, the document-image recognition device examines the rectangle R whether continuous character rectangles exist on a line inside the rectangle R, for each line included in the rectangle R, in order to extract character rectangles from the rectangle R. If it is determined at the step S414 that the continuous character rectangles do not exist on any lines in the rectangle R, the document-image recognition device proceeds to the step S416, and classifies the rectangle R as a figure/photograph or other-type rectangle. Subsequently, the document-image recognition device obtains the next rectangle in the rectangle list, at the step S420, and, then, processes the next rectangle, at the step S421. If the document-image recognition device has classified all the rectangles in the rectangle list, the document-image recognition device finishes the above-described steps. If not, the document-image recognition device proceeds to the step S402.

If it is determined at the step S414 that the continuous character rectangles exist on a line in the rectangle R, the document-image recognition device creates a large character rectangle T that includes the continuous character rectangles, at the step S415. It is expected that a plurality of character rectangles T be created in the rectangle R, if a plurality of character parts exist in separated areas of the rectangle R. In details, the document-image recognition device determines that the continuous character rectangles exist on a line, as follows. The document-image recognition device sets the center of a height of the first character rectangle among continuous character rectangles, to a standard line. The document-image recognition device, then, determines that continuous character rectangles exist on a line if three or more than three continuous character rectangles exist on the line, each character rectangle existing in a range of ±5 dots from the standard line.

Subsequently, the document-image recognition device adds the rectangle T as a character rectangle to the rectangle list, at the step S417. At the step S418, the document-image recognition device checks whether an area of the rectangle T is large enough by comparing the area of the rectangle T with the area of the rectangle R. If it is determined at the step S418 that the area of the rectangle T is large enough, the document-image recognition device discards the rectangle R from the rectangle list, at the step S419. If it is determined at the step S418 that the area of the rectangle T is not large enough, the document-image recognition device proceeds to the step S416, and classifies the rectangle R as a figure/photograph or other-type rectangle officially. Subsequently, the document-image recognition device processes the next rectangle in the rectangle list, at the step S421. The document-image recognition device repeats the above-described processes for each rectangle included in the rectangle list.

In details, the document-image recognition device determines that the area of the rectangle T is large enough compared to the area of the rectangle R, if the area of the rectangle T is equal to or larger than 80% of the area of the rectangle R.

In the above-described rectangle classifying process, the steps S401 through S408 are similar to an area separation process performed on a binary image. However, the above-described rectangle classifying process specifically performed on a color image includes the step of recursively performing the process shown in FIG. 8 to a rectangle classified as a figure/photograph or other-type rectangle at the step S408.

A description will now be given of a process to create an image, in which an entire area of each photograph rectangle is painted with a color. The process corresponds to the step S109 shown in FIG. 2.

Figure 10:
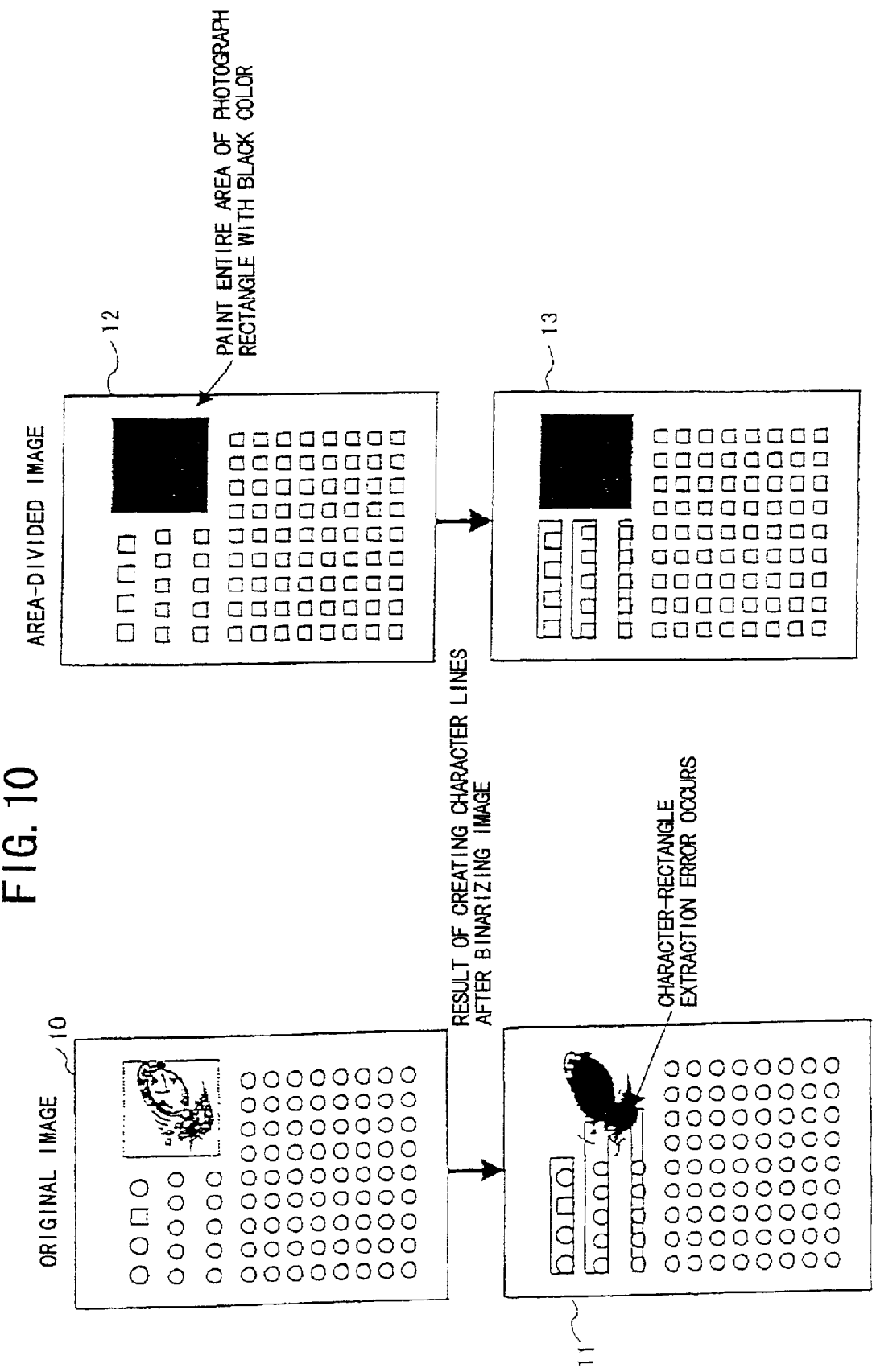
FIG. 10 is a diagram showing a process to create an image, in which each photograph rectangle is painted with a color.

FIG. 10 includes four pictures. A top left picture shows an original image 10. A top right picture shows an area-divided image 12. The area-divided image 12 is obtained by performing the step S109 on the original image 10, to paint an entire area of a rectangle that is determined as a photograph rectangle because of the color area separation process according to the present invention. The document-image recognition device binarizes an input color image to obtain a binary image, and carries out an OCR process to the binary image. If the document-image recognition device binarizes the original image 10 to obtain a binary image, and creates character (text) lines from the binary image, the document-image recognition device sometimes obtains an image 11 from the original image 10, as a result. In the image 11, character rectangles, that are located near a part of a photograph rectangle having a light color, are combined with the photograph rectangle by mistake. On the other hand, if the document-image recognition device binarizes the area-divided image 12 to obtain a binary image, and creates the character lines from the binary image, the document-image recognition device obtains an image 13 as a result, in which the character rectangles are created correctly.

A result of the area separation process according to the present invention can be adapted to an image recognition process other than the OCR process.

A description will now be given of a second embodiment of the present invention. As previously described, a colored document intends to have more colors and more complicated document layout than a monochrome document. Thus, it is hard to improve accuracy of an OCR process just by binarizing and carrying out an area separation process to the colored document.

For example, FIG. 11 is a diagram showing a table, in which each cell is separated by colors. The table shown in FIG. 11 may not be binarized appropriately as a table by use of a related-art binarization technology. Additionally, FIG. 12 is a diagram showing an image, in which characters are written on a texture whose gradation significantly changes from left to right. The image shown in FIG. 12 may also be binarized inappropriately for the OCR process by use of a related-art binarization technology.

If it is assumed that a background of each character area on an image is a fixed color or a moderate gradation, the method described in the first embodiment can be simply adapted to the character area. Alternatively, if it is assumed that each character on an image is written with a fixed color, an image-division-type binarizing method disclosed in Japanese Laid-open Patent Application No. 2001-8032 can be adapted to binarization of the character, thereby improving the binarization to a level at which the OCR process is possibly performed. However, a colored document is generally complicated, and often has problems peculiar to the colored document, as shown in FIGS. 11 and 12. Accordingly, it is generally hard to create an image suitable for the OCR process just by applying a combination of a related-art binarizing method and a related-art area separating method to a colored image.

In the second embodiment, a description will be given of a document-image recognition technology that enables recognition of a complicated color document that cannot be achieved by an individual technology, by adding a feedback process to the color area separation process described in the first embodiment, to create an image suitable for the OCR process. The second embodiment utilizes a feature of the color area separation process better at extracting a photograph or a figure than a character, and a feature of the binary area separation process better at extracting a character.

Figure 13:
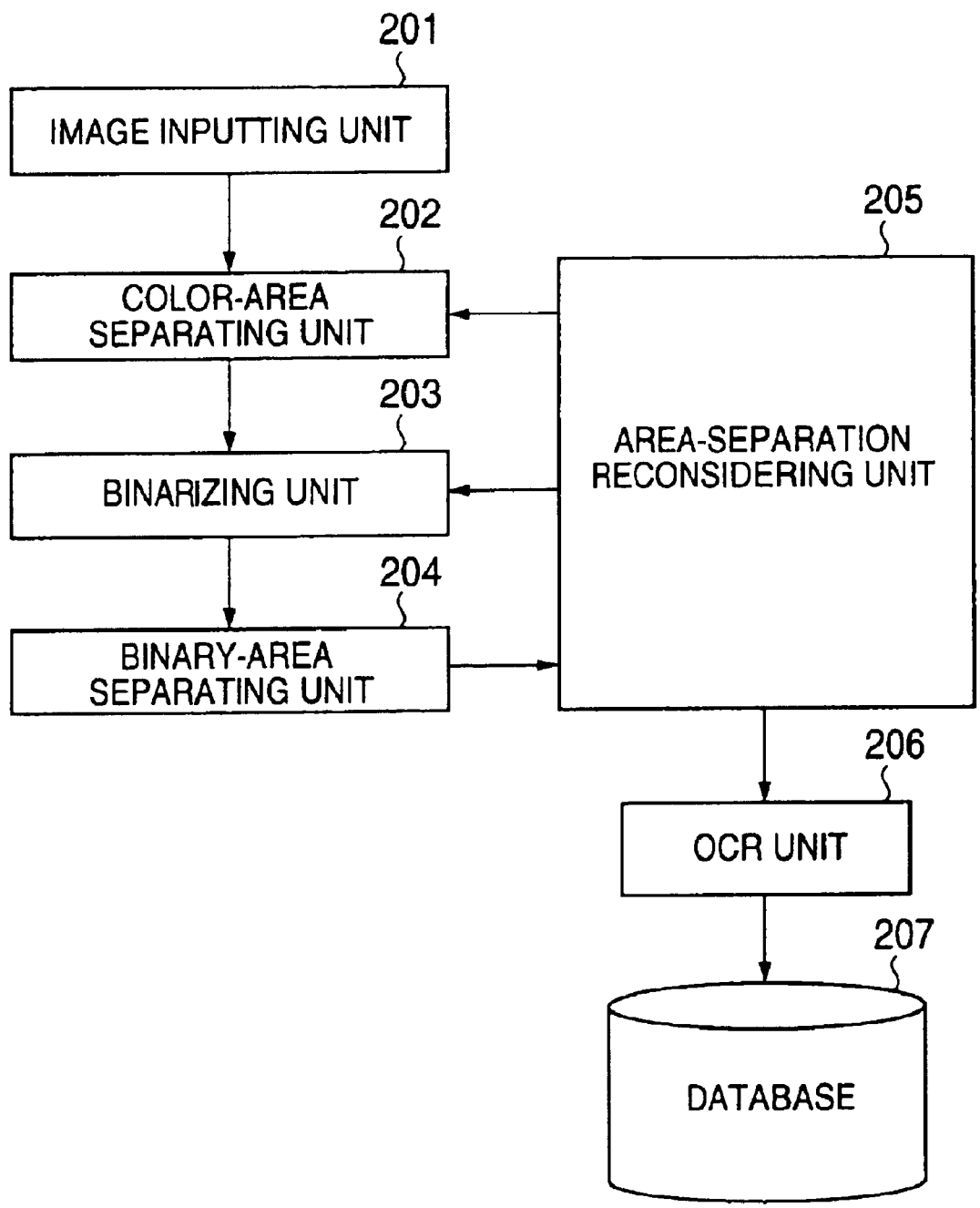
FIG. 13 is a block diagram showing a structure of a document-image recognition device according to a second embodiment of the present invention.

FIG. 13 is a block diagram showing a structure of a document-image recognition device according to the second embodiment of the present invention. A computer shown in FIG. 1 can be used as the document-image recognition device according to the second embodiment by using a program performing a process according to the second embodiment. Alternatively, the present invention can be performed by recording the program to a CD-ROM or the like, and installing the CD-ROM to a computer.

The document-image recognition device shown in FIG. 13 includes an image inputting unit 201, a color-area separating unit 202, a binarizing unit 203, a binary-area separating unit 204, an area-separation reconsidering unit 205, an OCR unit 206 and a database 207.

A color document image, that is, a paper document, is inputted to the document-image recognition device through the image inputting unit 201. For example, the color document image is inputted as a color digital image through a scanner or a network to the document-image recognition device. The color-area separating unit 202 divides the color document image into small areas such as a photograph area, a text or character area and a ruled-line area. In details, the color-area separating unit 202 performs the color area separation process described in the first embodiment.

The binarizing unit 203 converts the color document image to a binary image most appropriate for the later OCR process. As described later, the binarizing unit 203 separates a text from its background accurately, and prevents ruled lines and photographs from being faded, during a binarizing process. The binarizing unit 203 can emphasize an edge of a character, if necessary. Additionally, the binarizing unit 203 has a plurality of binarizing functions that have different features, and binarizes each area such as a photograph area, a text area or a ruled-line area that is classified by the color area separation process, separately, by use of a binarizing function most appropriate for the area.

The binary-area separating unit 204 carries out a binary area separation process to a binary image. This binary area separation process can be performed by use of a related-art area separation method.

The area-separation reconsidering unit 205 checks whether a result of the binary area separation process has consistency with a result of the color area separation process. If both results have parts different from each other, the area-separation reconsidering unit 205 decides to carry out a feedback process, in which the color area separation process, the binarizing process, and the binary area separation process are performed again on only the parts. The feedback process is carried out repeatedly until the both results satisfy certain conditions.

The OCR unit 206 performs the OCR process to the binary image obtained as described above. The database 207 stores a result of the OCR process.

A description will now be given of processes performed by the document-image recognition device according to the second embodiment, with reference to a flowchart shown in FIG. 14.

A color document image is initially inputted to the document-image recognition device, at a step S601. The document-image recognition device performs the color-area separation process to the color document image, at a step S602. Subsequently, the document-image recognition device binarizes each area separated from the color document image by using a binarizing method corresponding to a type of each separated area, thereby creating a single binary image to be used in the OCR process, at a step S603. At a step S604, the document-image recognition device performs the binary area separation process to the binary image created at the step S603 by use of a related-art area separation method.

The document-image recognition device compares a result of the binary area separation process with a result of the color-area separation process, at a step S605, and determines whether the feedback process is necessary, at a step S606. If it is determined at the step S606 that the feedback process is necessary, the document-image recognition device repeats the steps S602 through S605 to only a corresponding area. If it is determined at the step S606 that the feedback process is not necessary, the document-image recognition device carries out the OCR process, at a step S607, and, then, outputs a result of the OCR process to the database 207, at a step S608.

The document-image recognition device can be set to proceed to the step S607, if inconsistency detected by the comparison (S605) has decreased below a fixed level, or the steps S602 through S605 have been performed for a fixed number of times. Alternatively, the document-image recognition device can be set to proceed to the step S607 if a result of performing the steps S602 through S605 has matched the previous result of performing the steps S602 through S605. In the above-described processes, processes similar to the first embodiment are performed at the steps other than the step S603 binarizing each area by using a corresponding method, and the steps S605 and S606 carrying out the feedback process.

As described above, the color area separation process is performed on the color document image inputted to the document-image recognition device, by use of color and layout information, at the step S602 before binarizing the color document image at the step S603. According to the color area separation method described in the first embodiment, the document-image recognition device can detect areas of the color document image, and can detect a color of characters in a separated character rectangle. Since the document-image recognition device according to the second embodiment uses the color of characters before the OCR process, the color area separation method described in the first embodiment is suitable for the color area separation process performed by the document-image recognition device in the second embodiment.

A detailed description will now be given of the process to binarize each area in the color document image separately. The process corresponds to the step S603 shown in FIG. 14.

The most appropriate binary image for the OCR process differs with types of areas including such as characters, ruled lines, figures or photographs. For example, characters and backgrounds must be clearly distinguished from each other in the binarizing process. If a character has a missing part therein, such missing part affects the OCR process. Additionally, ruled lines cannot be blurred at all. On the other hand, figure and photograph areas are preferably binarized dimly to prevent the figure and photograph areas from being divided excessively. Thus, according to the second embodiment, the document-image recognition device creates the most appropriate binary image for the OCR process by binarizing each area of the color document image separately, as shown in FIG. 15.

Figure 15:
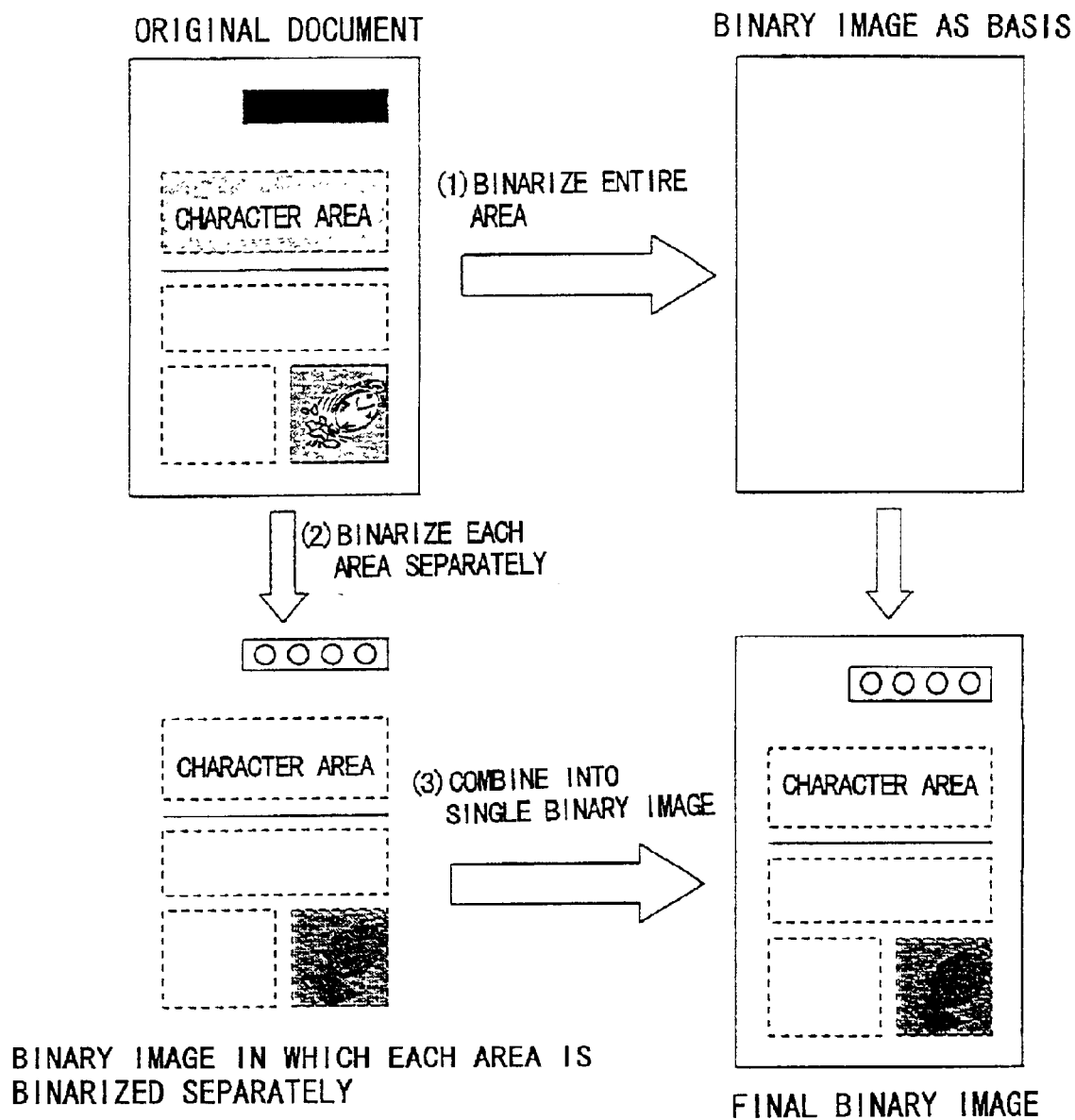
FIG. 15 is a diagram showing a binarizing method utilized in the second embodiment.
Figure 16:
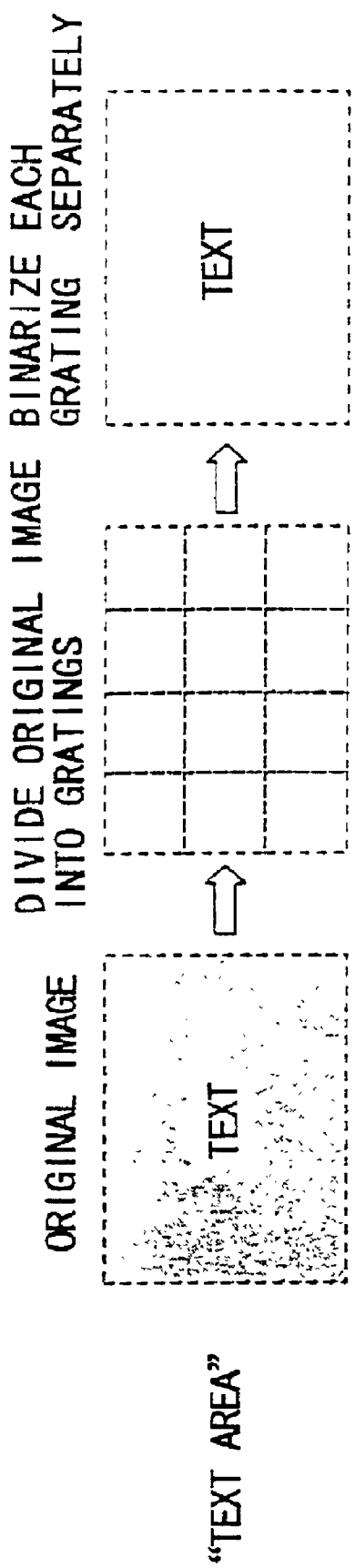
FIG. 16 is a diagram showing an image-division-type binarizing method.

FIG. 15 is a diagram showing a binarizing method performed by the document-image recognition device according to the second embodiment. A top left image of FIG. 15 shows the color document image (an original document) on which the color area separation process (S602) has been performed. The document-image recognition device initially creates a binary image that is a basis of a final binary image, by applying the discriminant analysis method, the image-division-type binarizing method, or other binarizing methods to an entire area of the original document.

Subsequently, the document-image recognition device binarizes each separated area by using a binarizing method appropriate for each separated area. In the second embodiment, the image-division-type binarizing method is applied to text areas, and the discriminant analysis method is applied to ruled-line, figure/photograph areas.

The image-division-type binarizing method disclosed in Japanese Laid-open Patent Application No. 2001-8032 is a method of dividing an original image into a plurality of gratings, and binarizing each grating separately. This method is applicable to the image shown in FIG. 12 having a sharp gradation change and a large surrounding noise, in order to separate characters from the background to a level at which a user can recognize the characters. Thus, the method is suitable for binarizing a text area. In the second embodiment, a width of each grating is adjusted in accordance with a width of an area to be binarized, as shown in FIG. 17.

On the other hand, a ruled line does not become blurred, and a figure or a photograph becomes a single block, by binarizing ruled-line areas and figure/photograph areas by use of the discriminant analysis method, and especially by setting a threshold of the binarizing process to a dark color. Thus, the ruled-line areas and the figure/photograph areas become binary images that are suitable for the binary area separation process performed at the step S604.

At last, the document-image recognition device pastes the binary images created separately from each area included in the color document image, onto the binary image that is the basis of the final binary image. As described above, the document-image recognition device creates a binary image at the step S603.

A detailed description will now be given of a process to compare the results of the color area separation process and the binary area separation process. The comparing process is performed at the steps S605 and S606 shown in FIG. 14.

The table including lines separated by colors cannot be expressed as a table frequently, because of the binarizing process, as shown in FIG. 11. With a tendency toward usage of colored documents, a layout of such documents becomes further complicated. Thus, it is assumed that the colored document cannot be accurately binarized only by use of a single binarizing process.

According to the second embodiment, the document-image recognition device obtains a binary image most appropriate for the OCR process as well as outputs an accurate result of area separation processes, by comparing the result of the binary area separation process with the result of the color area separation process, and by carrying out the feedback process if necessary.

Figure 18:
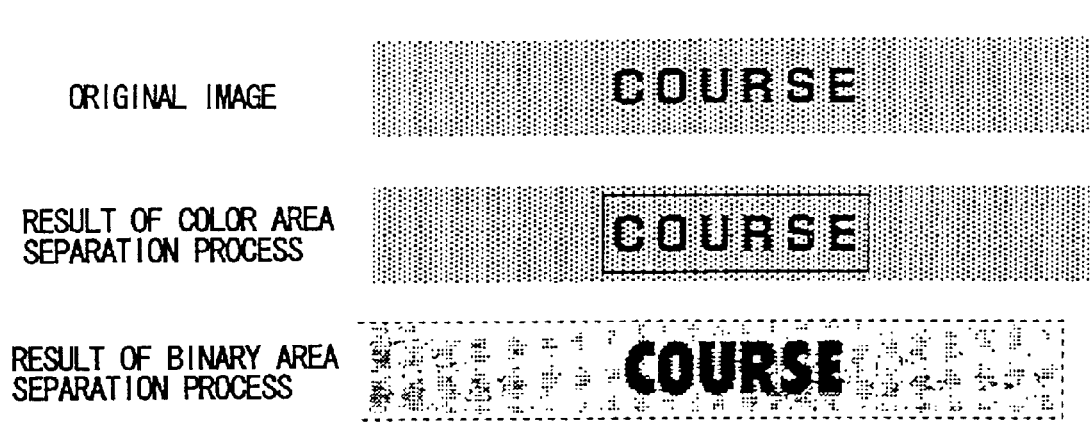
FIG. 18 is a diagram showing a result of an area separation process.
Figure 19:
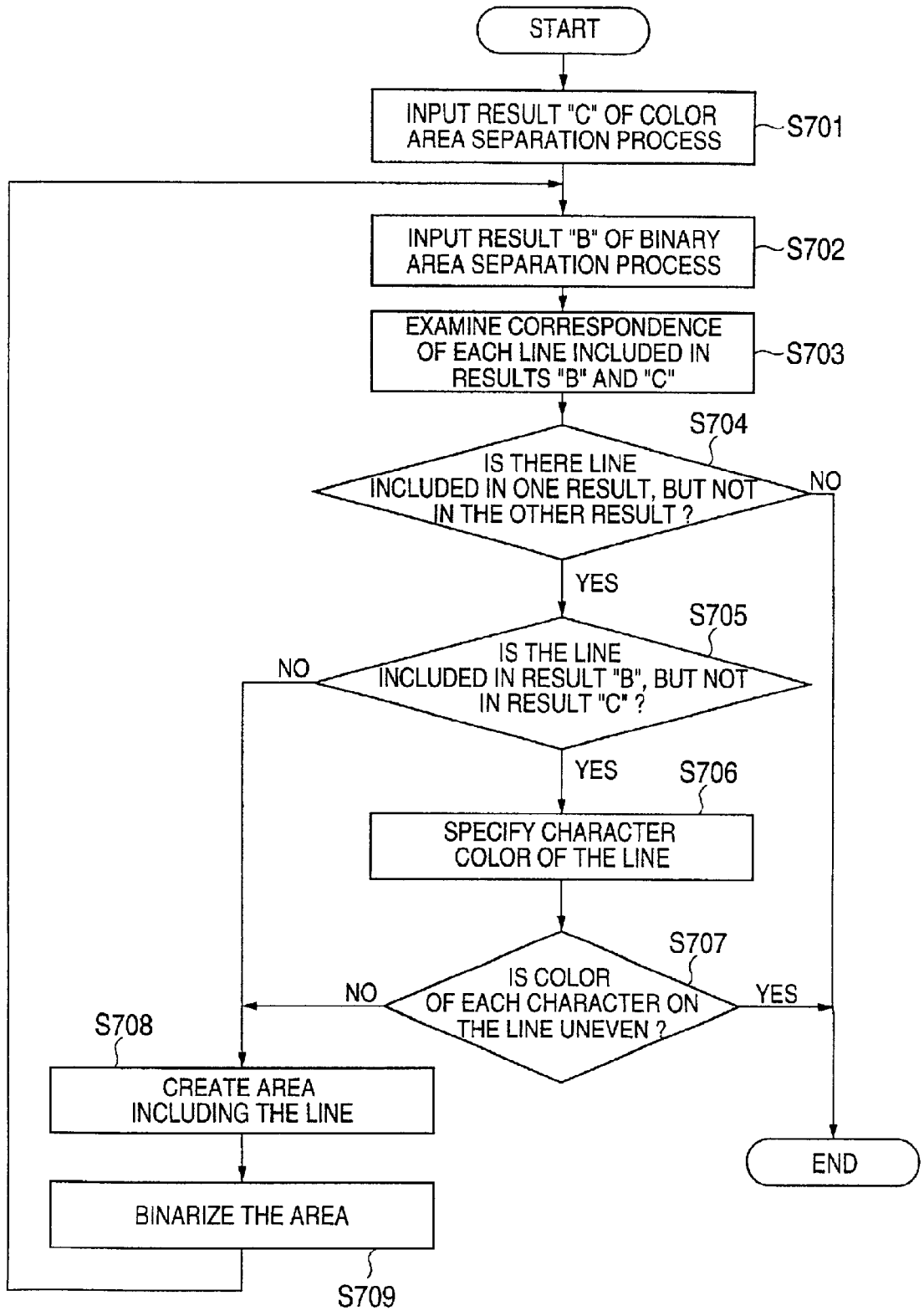
FIG. 19 is a flowchart showing a process to correct the result of the area separation process shown in FIG. 18.

FIG. 18 is a diagram showing a case in which a text line including a word "COURSE" cannot be extracted from a binary image during the binary area separation process, because of the preceding binarizing process. Additionally, FIG. 19 is a flowchart showing a process to correct the result of the binary area separation process for the case shown in FIG. 18.

A result "C" of the color area separation process and a result "B" of the binary area separation process are initially inputted to the document-image recognition device respectively at a step S701 and a step S702. Subsequently, the document-image recognition device examines correspondence of the result B to the result C by every line, at a step S703.

At a step S704, the document-image recognition device examines the results B and C whether the result B or C includes a line that does not exist in the other result. In details, the document-image recognition device compares coordinates of character rectangles included in the results B and C. For example, the document-image recognition device determines that a line included in one of the results B and C does not exist in the other result, in a case in which rectangle coordinates corresponding to coordinates of a character rectangle obtained from the color area separation process do not exist in the result B of the binary area separation process.

If it is determined at the step S704 that the result B or C includes a line that does not exist in the other result, the document-image recognition device proceeds to a step S705. On the other hand, if it is determined at the step S704 that all the lines included in the result B are the same as that of the result C, the document-image recognition device finishes the processes shown in FIG. 19, and proceeds to the OCR process at the step S607 shown in FIG. 14.

At the step S705, the document-image recognition device checks whether the line detected at the step S704 exists in the result B, but not in the result C. If it is determined at the step S705 that the line detected at the step S704 exists in the result C, but not in the result B, the document-image recognition device proceeds to a step S708. On the other hand, if it is determined at the step S705 that the line detected at the step S704 exists in the result B, but not in the result C, the document-image recognition device proceeds to a step S706. At the step S706, the document-image recognition device specifies a character color of the line from the original color document image, in order to examine unevenness of the character color on the line. At a step S707, the document-image recognition device decides whether the characters on the line have uneven character colors. For instance, the document-image recognition device calculates dispersion of the RGB values of each character on the line, and, then, determines that unevenness of the character color on the line is large if the dispersion is detected to be higher than a fixed value.

In the case in which a line that could not be extracted by the color area separation process exist in the result B of the binary area separation process at the step S705, a noise is often mixed with the line because of an unsatisfactory binarizing process. In such a case, the document-image recognition device detects the noise by calculating the unevenness of the character color on the line at the steps S706 and S707, assuming that a noise color is different from a correct character color.

If it is determined at the step S707 that the character color on the line is even, the document-image recognition device proceeds to the step S708. The document-image recognition device creates an area including the line, at the step S708. If it is determined at the step S707 that the character color on the line is uneven, the document-image recognition device finishes the processes shown in FIG. 19, and proceeds to the OCR process at the step S607 shown in FIG. 14.

At a step S709 following the step S708, the document-image recognition device binarizes the area created at the step S708, and performs the binary area separation process to the area. Subsequently, the document-image recognition device proceeds to the step S702.

In the above-described processes, if a line extracted from the color document image by the color area separation process does not exist in the result B of the binary area separation process, the document-image recognition device creates an area including the line. Subsequently, the document-image recognition device binarizes the area, and performs the binary area separation process to the area. The document-image recognition device improves a final result of an area separation process by repeating the feedback process until the results B and C have no significant difference.

In other words, the document-image recognition device performs the feedback process without examining a character color on the line in order to extract the line, in the case in which the line extracted from the color document image by the color area separation process does not exist in the result B of the binary area separation process.

The document-image recognition device performs the feedback process without examining the character color on the line if the line extracted from the color document image by the color area separation process does not exist in the result B of the binary area separation process. Because the color area separation process using color information has higher accuracy to detect existence of character lines than the binary area separation process using only shape or binary information. The document-image recognition device may not extract character lines accurately by using the color area separation process. However, since possibility that character lines are detected by the color area separation process is high because of the above reason, the document-image recognition device improves character detection accuracy for the OCR process, by repeating the binarizing process and the binary area separation process.

Figure 20A:
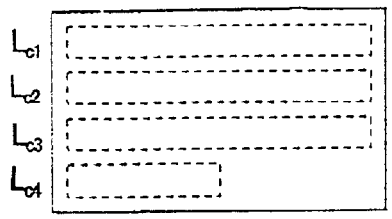
FIGS. 20A and 20B are diagrams showing results of a color area separation process and a binary area separation process.
Figure 20B:
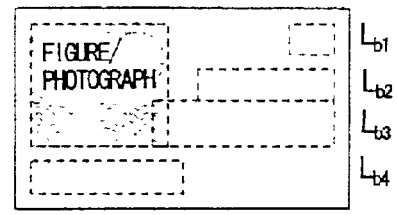

FIGS. 20A and 20B are diagrams showing results of the color area separation process and the binary area separation process performed on an image. FIG. 20A shows the result of the color area separation process performed on the image, in which text lines are correctly detected and separated. FIG. 20B shows the result of the binary area separation process performed on the image, in which a part of the text lines is extracted incorrectly because of a unsatisfactory binarizing process, and is combined with a surrounding noise. Consequently, a figure/photograph area is incorrectly extracted, as shown in FIG. 20B.

Figure 21:
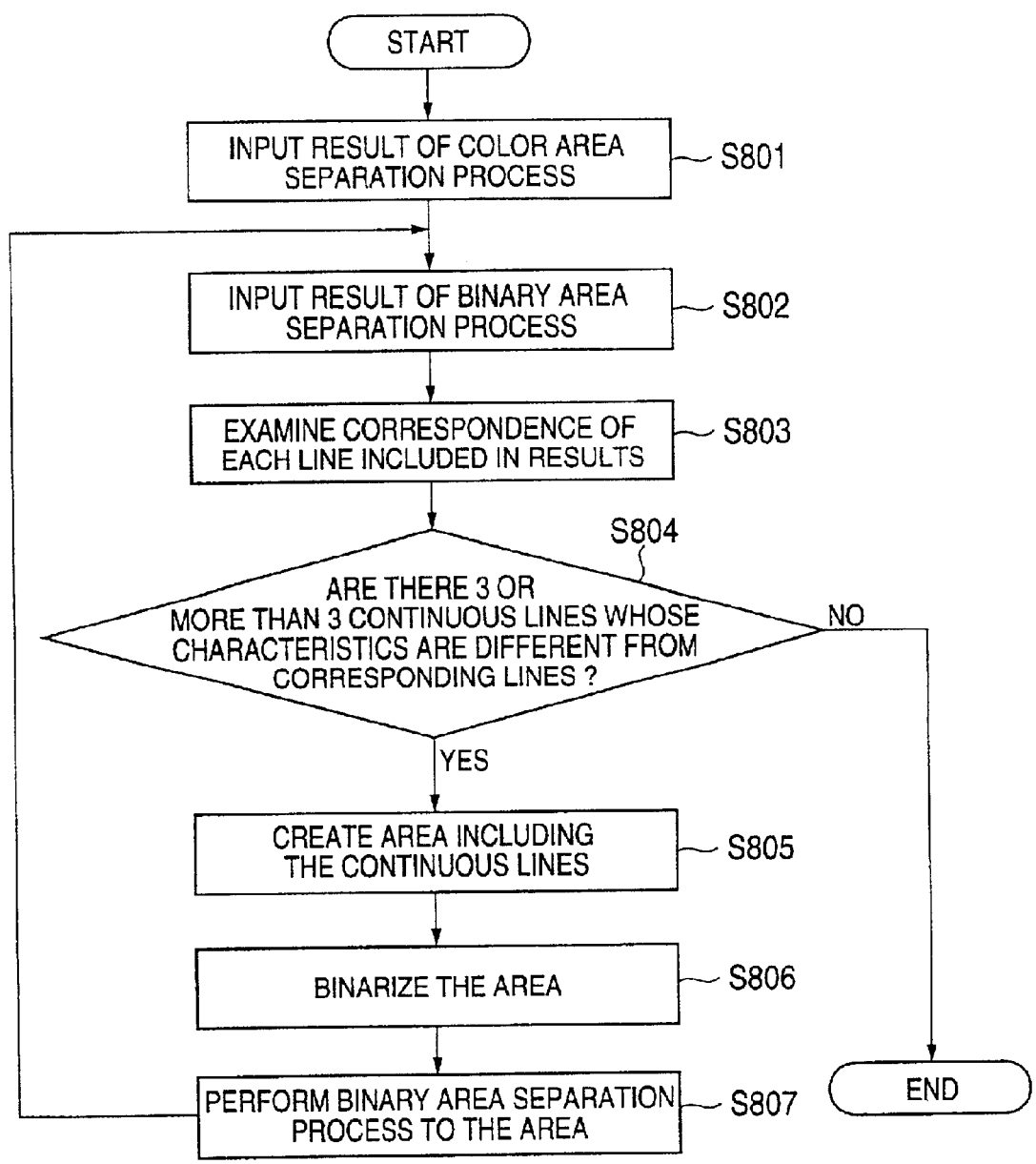
FIG. 21 is a flowchart showing a process to correct the result of the binary area separation process shown in FIG. 20B.

If an error shown in FIG. 20B occurs, the document-image recognition device corrects the error, by verifying correctness of the result of the area separation processes, and performing the feedback process that repeats the binarizing process and the binary area separation process. FIG. 21 is a flowchart showing a process to correct the result of the binary area separation process shown in FIG. 20B.

A result of the color area separation process and a result of the binary area separation process are inputted to the document-image recognition device respectively at a step S801 and a step S802. At a step S803, the document-image recognition device examines both results to search for correspondence of the results for every line included in the results.

Subsequently, at a step S804, the document-image recognition device checks whether there are a fixed number or more than the fixed number of lines exist continuously in one of the results of the color area separation process and the binary area separation process, the lines having features different from their corresponding lines in the other result. The fixed number is set to three in the second embodiment. The lines and their corresponding lines are indicated as $L_{ci}$ and $L_{bi}$ in the results shown in FIGS. 20A and 20B. In details, it is determined at the step S804 that features of a line in one of the results are different from its corresponding line in the other result, if the line satisfies one of the following conditions.

A width of the line is less than or equal to 60% of a width of the corresponding line.

A difference in average character sizes of the line and the corresponding line is more than or equal to 3 points.

A difference in average character colors (average luminosity) of the line and the corresponding line is more than or equal to 30.

Additionally, distribution of edges and the like may be used for determining a difference in the features of the line and the corresponding line.

If it is determined at the step S804 that there are three or more than three lines exist continuously in one of the results, the lines having features different from their corresponding lines in the other result, the document-image recognition device creates an area including the lines, at a step S805. Subsequently, the document-image recognition device binarizes the area, at a step S806, and performs the binary area separation process to the binary area, at a step S807. The document-image recognition device, then, proceeds to the step S802, and repeats the above-described steps until the results of the color area separation process and the binary area separation process have no significant difference.

Figure 14:
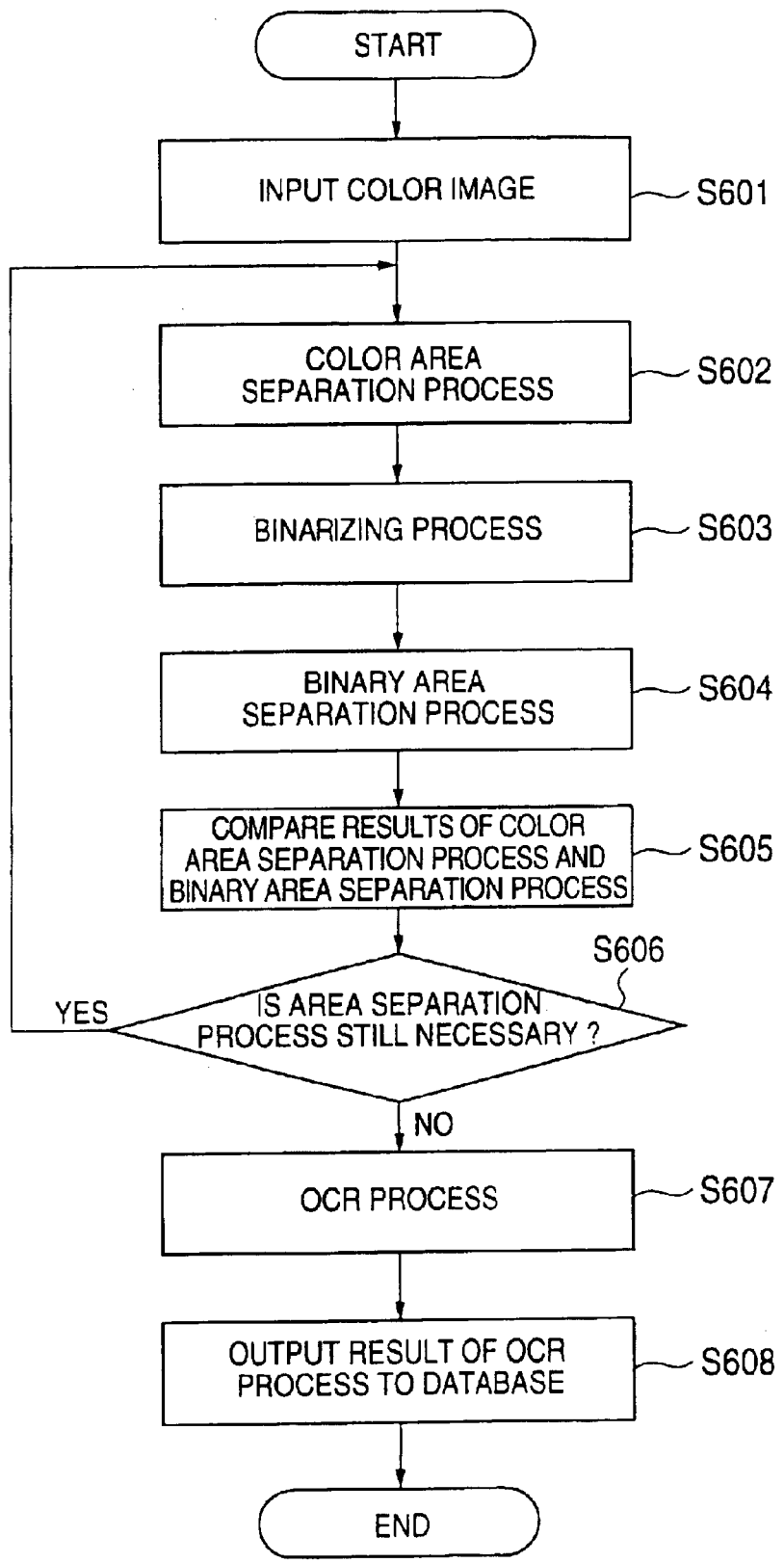
FIG. 14 is a flowchart showing processes performed by the document-image recognition device according to the second embodiment.

On the other hand, if it is determined at the step S804 that there are less than three or no lines exist continuously in one of the results, the lines having features different from their corresponding lines in the other result, the document-image recognition device finishes the above-descried processes, and carries out the OCR process at the step S607 shown in FIG. 14.

The document-image recognition device performs the OCR process by using a related-art OCR method after creating a binary image suitable for the OCR process and the result of the area separation processes. Subsequently, the document-image recognition device stores a result of the OCR process in the database 207 with layout information such as a character codes, degrees of recognition certainty, positions, font sizes and the like, by following a related-art method.

According to the present invention as described above, the document-image recognition device separates areas including characters, ruled lines, illustrations, and photographs directly from a color image by use of color information, without binarizing the areas. Accordingly, the color image does not lose the color information, and the document-image recognition device can achieve accurate area separation of the color image.

Additionally, the document-image recognition device can create a run by combining a plurality of pixels that are different from a background color of a color image since the document-image recognition device specifies the background color accurately. In other words, the document-image recognition device can accurately extract a rectangle that is a document element, from the color document. Further, by specifying a background color of a partial area of the color document, the document-image recognition device can perform recursive area separation inside the partial area.

Additionally, by reducing a size of an original document, an access cost to the original image can be cut substantially. In other words, the document-image recognition device can increase its speed to process the original image, and can reduce a memory space used for storing the original image. In addition, the compression method adapted to the present invention has an effect to smooth the original image quickly, thereby simplifying extraction of document elements from the original image. Furthermore, a structure of the present invention can be simplified by dividing the original image into m×m gratings when creating a reduced-size image from the original image.

Additionally, differences in color (RGB) values are used for separating document elements from background areas in an image, and, thus, a color difference between pixels can be obtained by a simple calculation, and satisfactory accuracy can be obtained in separation of the document elements from the background areas. Further, a text part located near a figure/photograph are can be accurately extracted from the image, by painting the entire figure/photograph area with a specified color, since the figure/photograph area is easily affected by the binarizing process. Thus, accuracy of the OCR process can be improved.

Additionally, as described in the second embodiment, the document-image recognition device can accurately perform the OCR process to a color document that has problems hardly solved by a related-art color document recognition technology, by including a feedback structure feeding back to processes such as the binary area separation process and the binarizing process preceding the OCR process. The document-image recognition device can also perform the OCR process accurately, to a table having cells separated by colors, a color document having characters written on a texture whose gradation changes radically, or a mixture of the table and the color document.

Additionally, by comparing results of the color area separation processes and the binary area separation process by each character (text) line instead of comparing each area, the document-image recognition device can avoid an error combining character lines with areas incorrectly, in which such an error is inevitable by a related-art technology. In details, the document-image recognition device can accurately determine whether characters exist in a comparison range by specifying a character color of the range, and examining unevenness of the character color in the range. Consequently, the document-image recognition device feeds back only a range where characters exist, thereby improving character extraction accuracy without affecting other areas.

Additionally, by utilizing a result of character extraction performed on an image processed through the color area separation process using color information, the document-image recognition device can extract characters, which cannot be processed through the OCR process because of the binarizing process. Furthermore, by comparing layout features of a plurality of lines in a comparison range, the document-image recognition device can correctly detect an error in either of results of the color area separation process and the binary area separation process. The document-image recognition device can improve character extraction accuracy without affecting other areas by feeding back only an area including the error.

The above description is provided in order to enable any person skilled in the art to make and use the invention and sets forth the best mode contemplated by the inventors of carrying out the invention.

The present invention is not limited to the specially disclosed embodiments and variations, and modifications may be made without departing from the scope and spirit of the invention.

The present application is based on Japanese Priority Application No. 2000-124941, filed on Apr. 25, 2000, the entire contents of which are hereby incorporated by reference.

What is claimed is:

1. A method of recognizing a document image including a plurality of areas, comprising:
   a) inputting said document image as a digital image;
   b) specifying a background color of said document image;
   c) extracting a plurality of pixels located in areas other than a background area from said document image by use of said background color;

d) creating a plurality of connected elements by combining said plurality of pixels;

e) classifying said plurality of connected elements into a plurality of fixed types of areas by using at least features of shapes of said plurality of connected elements to obtain an area-separated document images;

f) creating a binary image by binarizing said area-separated document image;

g) classifying a plurality of areas included in said binary image into said plurality of fixed types of areas;

h) comparing a result of the classifying (e) and a result of the classify (g);

i) correcting said area-separated document image if said result of the classifying (e) is not equal to said result of the classifying (g); and j) recognizing a character in a text area of said area-separated document image.

2. The method as claimed in claim 1, wherein said specifying (b) includes:

k) clustering a plurality of colors on said document image; and l) setting a representative color of a largest cluster obtained by the clustering (k) to said background color.

3. The method as claimed in claim 2, wherein said clustering (k) includes:

sampling each of the plurality of pixels at regular intervals; and clustering the plurality of colors on said document image by use of a plurality of pixel values obtained by smoothing pixels surrounding said each of the plurality of pixels.

4. The method as claimed in claim 1, further comprising reducing a size of said document image, wherein said reducing the size of said document image includes:

dividing said document image into a plurality of blocks;

obtaining a representative color of each of said plurality of blocks;

determining colors of said plurality of blocks after sizes of said plurality of blocks are reduced, by comparing said representative color and said background color; and reducing said plurality of blocks into the plurality of pixels having said colors.

5. The method as claimed in claim 4, wherein said each of the plurality of blocks is a 3×3 or 4×4 grating.

6. The method as claimed in claim 1, wherein said extracting (c) includes determining a focused pixel as a pixel located in an area other than said background area if a difference between three primary colors of said background color and said focused pixel is larger than a fixed value.

7. The method as claimed in claim 1, further comprising:

creating the document image, in which a figure or photograph rectangular area separated by said classifying (e) is painted over with a specified color;

binarizing said document image; and recognizing characters on a binary image obtained by binarizing said document image.

8. The method as claimed in claim 1, further comprising recursively performing said classifying (e) to a specific rectangular area classified at said classifying (e).

9. A method of recognizing a document image, comprising:

a) inputting said document image as a digital image;

b) performing color area separation to said document image;

c) creating a binary image for each area separated by said color area separation;

d) creating a single binary image by combining said binary image for each area, thereby performing binarization to said document image;

e) performing binary area separation to said single binary image;

f) comparing a result of said color area separation and a result of said binary area separation; and g) obtaining a binary image and a result of area separation by performing a feedback process until a certain condition is satisfied, or for a fixed number of times, in accordance with a result of the comparing (f).

10. The method as claimed in claim 9, wherein said feedback process is performed in a case in which the certain condition is not satisfied in a range of said document image as the result of the comparing (f), said feedback process including:

creating an area that includes said range;

performing said color area separation, said binarization and said binary area separation to said area; and performing said comparing (f).

11. The method as claimed in claim 9, wherein said feedback process is performed in a case in which a text line is extracted from a range in said document image by one of said color area separation and said binary area separation, and a character rectangle including characters is not extracted from said range by the other, said feedback process including:

specifying a character color of said character rectangle;

determining that said range includes a character if said character color is even throughout said range;

performing said color area separation, said binarization, said binary area separation to said range by use of said character color; and performing said comparing (f).

12. The method as claimed in claim 11, wherein said feedback process includes:

creating an area including the text line in a case in which said text line extracted from the range by said color area separation does not exist in the result of the binary area separation as the result of said comparing (f);

performing said binarization and said binary area separation to said area; and performing said comparing (f).

13. The method as claimed in claim 9, wherein said feedback process is performed in a case in which layout features of a fixed number or more than the fixed number of text lines are continuously different between said result of the color area separation and said result of the binary area separation as the result of said comparing (f), said feedback process including:

creating an area including said text lines;

binarizing said area;

performing said binary area separation to said area; and performing said comparing (f).

14. The method as claimed in claim 9, wherein an image-division-type binarizing method is applied to a text area of said document image, and a discriminant analysis method is applied to ruled-line, figure, and photograph areas.

15. The method as claimed in claim 9, wherein said color area separation includes:

specifying a background color of said document image;

extracting a plurality of pixels located outside a background area from said document image by use of said background color;

creating a plurality of connected elements by combining said plurality of pixels; and classifying said plurality of connected elements into a plurality of fixed types of areas by use of at least features of shapes of said connected elements to obtain an area-separated document image.

16. A document-image recognition device recognizing a document image including a plurality of areas, comprising:

an input unit inputting said document image as a digital image;

a background-color specifying unit specifying a background color of said document image;

an extracting unit extracting a plurality of pixels located outside a background area from said document image by use of said background color;

a creating unit creating a plurality of connected elements by combining said plurality of pixels;

a classifying unit classifying said plurality of connected elements into a plurality of fixed types of areas by use of at least features of shapes of said connected elements to obtain an area-separated document image;

a binary-image creating unit creating a binary image by binarizing said area-separated document image;

a correcting unit classifying a plurality of areas included in said binary image into said plurality of fixed types of areas, and correcting said area-separated document image by comparing said area-separated document image with a result of classifying the plurality of areas; and a recognizing unit recognizing a character in a text area of said document image.

17. The document-image recognition device as claimed in claim 16, wherein said background-color specifying unit includes:

a clustering unit clustering a plurality of colors on said document image; and a setting unit setting a representative color of a largest cluster obtained by clustering said plurality of colors on said document image to said background color.

18. The document-image recognition device as claimed in claim 17, wherein said clustering unit includes:

a sampling unit sampling the plurality of pixels at regular intervals; and a cluster unit clustering the plurality of colors on said document image by use of a plurality of pixel values obtained by smoothing pixels surrounding said plurality of pixels.

19. The document-image recognition device as claimed in claim 16, further comprising a reducing unit reducing a size of said document image, wherein said reducing unit includes:

a dividing unit diving said document image into a plurality of blocks;

a representative-color obtaining unit obtaining a representative color of each of said plurality of blocks;

a color determining unit determining colors of said plurality of blocks after sizes of said plurality of blocks are reduced, by comparing said representative color and said background color; and a block reducing unit reducing said plurality of blocks into the plurality of pixels having said colors.

20. The document-image recognition device as claimed in claim 19, wherein each of said plurality of blocks is a 3×3 or 4×4 grating.

21. The document-image recognition device as claimed in claim 16, wherein said extracting unit includes a pixel determining unit determining a focused pixel as a pixel located outside said background area if a difference between three primary colors of said background color and said focused pixel is larger than a fixed value.

22. The document-image recognition device as claimed in claim 16, further comprising:

a document-image creating unit creating the document image, in which a figure or photograph rectangular area separated by said classifying unit is painted over with a specified color;

a binarizing unit binarizing said document image; and a character recognizing unit recognizing characters on a binary image obtained by binarizing said document image.

23. The document-image recognition device as claimed in claim 16, recursively carrying out a process performed by said classifying unit to a specific rectangular area classified by said classifying unit.

24. A document-image recognition device recognizing a document image, comprising:

an input unit inputting said document image as a digital image;

a color area separation unit performing color area separation to said document image;

a binary-image creating unit creating a binary image for each area separated by said color area separation;

a binary area separation unit creating a single binary image by combining said binary image for each area, thereby performing binarization to said document image, and performing binary area separation to said single binary image;

a comparing unit comparing a result of said color area separation and a result of said binary area separation; and an obtaining unit obtaining a binary image and a result of area separation by performing a feedback process until a certain condition is satisfied, or for a fixed number of times, in accordance with a result of comparison carried out by said comparing unit.

25. The document-image recognition device as claimed in claim 24, wherein said feedback process is performed in a case in which a text line is extracted from a range in said document image by one of said color area separation and said binary area separation, and a character rectangle including characters is not extracted from said range by the other, said feedback process including:

specifying a character color of said character rectangle;

determining that said range includes a character if said character color is even throughout said range;

performing said color area separation, said binarization, said binary area separation to said range by use of said character color; and performing said comparison.

26. The document-image recognition device as claimed in claim 25, wherein said feedback process includes:

creating an area including the text line in a case in which said text line extracted from the range by said color area separation does not exist in the result of the binary area separation as the result of said comparison;

performing said binarization and said binary area separation to said area; and performing said comparison.

27. The document-image recognition device as claimed in claim 24, wherein said feedback process is performed in a case in which layout features of a fixed number or more than the fixed number of text lines are continuously different between said result of the color area separation and said result of the binary area separation as the result of said comparison, said feedback process including:

creating an area including said text lines;

binarizing said area;

performing said binary area separation to said area; and performing said comparison.

28. A record medium readable by a computer, tangibly embodying a program of instructions executable by the computer to carry out a document-image recognition process, said instructions comprising:

a) inputting said document image as a digital image;

b) specifying a background color of said document image;

c) extracting a plurality of pixels located outside a background area from said document image by use of said background color;

d) creating a plurality of connected elements by combining said plurality of pixels;

e) classifying said plurality of connected elements into a plurality of fixed types of areas by use of at least features of shapes of said connected elements to obtain an area-separated document image;

f) creating a binary image by binarizing said area-separated document image;

g) classifying a plurality of areas included in said binary image into said plurality of fixed types of areas;

h) comparing a result of the classifying (e) and a result of the classifying (g);

i) correcting said area-separated document image if said result of the classifying (e) is not equal to said result of the classifying (a); and j) recognizing a character in a text area of said area-separated document image.

29. A record medium readable by a computer, tangibly embodying a program of instructions executable by the computer to carry out a document-image recognition process, said instructions comprising:

a) inputting said document image as a digital image;

b) performing color area separation to said document image;

c) creating a binary image for each area separated by said color area separation;

d) creating a single binary image by combining said binary image for each area, thereby performing binarization to said document image;

e) performing binary area separation to said single binary image;

f) comparing a result of said color area separation and a result of said binary area separation; and g) obtaining a binary image and a result of area separation by performing a feedback process until a certain condition is satisfied, or for a fixed times, in accordance with a result of the comparing (f).

* * * * *